US011574342B2

United States Patent
Kim

(10) Patent No.: US 11,574,342 B2
(45) Date of Patent: Feb. 7, 2023

(54) SEAMLESS PROMOTION REDEMPTION

(71) Applicant: Groupon, Inc., Chicago, IL (US)

(72) Inventor: Benjamin Kim, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 19 days.

(21) Appl. No.: 16/726,436

(22) Filed: Dec. 24, 2019

(65) Prior Publication Data

US 2020/0258122 A1 Aug. 13, 2020

Related U.S. Application Data

(63) Continuation of application No. 14/312,588, filed on Jun. 23, 2014, now Pat. No. 10,552,868, which is a
(Continued)

(51) Int. Cl.
*G06Q 30/00* (2012.01)
*G06Q 30/02* (2012.01)
(Continued)

(52) U.S. Cl.
CPC ..... *G06Q 30/0267* (2013.01); *G06Q 30/0222* (2013.01); *G06Q 30/0259* (2013.01);
(Continued)

(58) Field of Classification Search
CPC .. G06Q 30/02; G06Q 20/203; G06Q 30/0268; G06Q 30/0269; G06Q 20/20;
(Continued)

(56) References Cited

U.S. PATENT DOCUMENTS 5,638,279 A * 6/1997 Kishi ................. G01C 21/3632
340/990
6,347,229 B1 * 2/2002 Zelmanovich .......... G01S 1/026
455/562.1
(Continued)

FOREIGN PATENT DOCUMENTS

JP 2000-134147 A 5/2000
JP 2000134147 A * 5/2000 ............ H04M 11/00
(Continued)

OTHER PUBLICATIONS

Smart Card Alliance. Bluetooth Low Energy (BLE) 101: A Technology Primer with Example Use Cases. (Jun. 2014). Retrieved online Sep. 21, 2019. https://www.securetechalliance.org/resources/pdf/BLE101-FINAL-053014.pdf (Year: 2014).*
(Continued)

*Primary Examiner* — James A Reagan
(74) *Attorney, Agent, or Firm* — Alston & Bird LLP

(57) ABSTRACT

Systems and related methods of providing seamless transactions, including payments and promotion redemptions, are discussed herein. Some embodiments may provide for a system including a communication beacon and one or more servers. The communication beacon may be configured to communicate with consumer devices via a direct wireless connection when the consumer devices are within a wireless direct communicable range of the communication beacon. The one or more servers may be configured to associate the communication with a merchant and receive consumer presence data from the communication beacon such that consumer presence at the merchant may be determined. In response, the one or more servers may be configured to perform a seamless transaction on behalf the consumer that allows the consumer to provide payments or redeem pro-
(Continued)

motions, among other things, simply by self-identifying with the merchant while carrying the consumer device.

20 Claims, 14 Drawing Sheets

Related U.S. Application Data continuation-in-part of application No. 14/248,676, filed on Apr. 9, 2014.

(51) Int. Cl.
    *H04B 7/26*      (2006.01)
    *H04W 4/02*      (2018.01)
    *H04W 4/12*      (2009.01)

(52) U.S. Cl.
    CPC ..... *G06Q 30/0261* (2013.01); *G06Q 30/0269* (2013.01); *G06Q 30/0281* (2013.01); *H04B 7/26* (2013.01); *H04W 4/02* (2013.01); *H04W 4/12* (2013.01)

(58) Field of Classification Search
    CPC .. G06Q 20/32; G06Q 20/327; G06Q 20/3276; G06Q 20/343; G06Q 20/3552; G06Q 30/00; G06Q 30/06; G06Q 99/00; G06K 17/00
    USPC ......................................................... 705/14.1
    See application file for complete search history.

(56) References Cited

U.S. PATENT DOCUMENTS

| | | | | |
|---|---|---|---|---|
| 6,362,778 B2* | 3/2002 | Neher | | G08B 25/006 |
| | | | | 455/404.2 |
| 6,587,835 B1 | 7/2003 | Treyz et al. | | |
| 6,776,334 B1* | 8/2004 | Garg | | G01S 5/16 |
| | | | | 235/382 |
| 6,816,730 B2 | 11/2004 | Davies | | H04W 84/18 |
| | | | | 455/436 |
| 6,907,238 B2* | 6/2005 | Leung | | G01S 1/68 |
| | | | | 340/991 |
| 6,915,135 B1 | 7/2005 | McKee et al. | | |
| 7,010,267 B2* | 3/2006 | Vanluijt | | G06Q 20/382 |
| | | | | 455/41.2 |
| 7,123,139 B2 | 10/2006 | Sweeney | | |
| 7,324,957 B2 | 1/2008 | Boys | | |
| 7,653,573 B2* | 1/2010 | Hayes, Jr. | | G06Q 30/0633 |
| | | | | 705/26.43 |
| 7,683,773 B1 | 3/2010 | Goodall et al. | | |
| 7,890,116 B2* | 2/2011 | Salokannel | | H04W 28/18 |
| | | | | 455/452.1 |
| 7,924,149 B2* | 4/2011 | Mendelson | | G01S 1/68 |
| | | | | 340/539.11 |
| 8,160,045 B1* | 4/2012 | Chhabra | | H04W 56/00 |
| | | | | 370/342 |
| 8,222,990 B2 | 7/2012 | Gerner et al. | | |
| 8,229,458 B2 | 7/2012 | Busch | | |
| 8,401,710 B2 | 3/2013 | Budhraja et al. | | |
| 8,489,112 B2* | 7/2013 | Roeding | | G06Q 30/0238 |
| | | | | 705/14.1 |
| 8,818,909 B2 | 8/2014 | Bosworth et al. | | |
| 9,159,066 B2* | 10/2015 | Roeding | | G01S 5/18 |
| 9,349,128 B1 | 5/2016 | Kerr et al. | | |
| 9,426,615 B2* | 8/2016 | Vigier | | H04W 4/02 |
| 10,909,562 B2* | 2/2021 | Roeding | | H04W 4/33 |
| 2002/0016740 A1 | 2/2002 | Ogasawara | | |
| 2002/0029172 A1* | 3/2002 | I'Anson | | G06Q 30/02 |
| | | | | 705/26.62 |
| 2002/0095333 A1* | 7/2002 | Jokinen | | G06Q 30/0269 |
| | | | | 705/14.66 |
| 2002/0102995 A1* | 8/2002 | Zelmanovich | | H04W 64/00 |
| | | | | 455/457 |
| 2002/0132614 A1* | 9/2002 | Vanluijt | | G06Q 20/382 |
| | | | | 455/414.1 |
| 2002/0160817 A1* | 10/2002 | Salmimaa | | G06F 3/04817 |
| | | | | 455/566 |
| 2003/0004802 A1 | 1/2003 | Callegari | | |
| 2003/0100315 A1* | 5/2003 | Rankin | | H04M 3/487 |
| | | | | 455/456.3 |
| 2003/0132298 A1 | 7/2003 | Swartz et al. | | |
| 2005/0096013 A1* | 5/2005 | Lehikoinen | | H04W 4/02 |
| | | | | 455/411 |
| 2005/0250552 A1* | 11/2005 | Eagle | | H04W 4/21 |
| | | | | 455/567 |
| 2006/0036485 A1 | 2/2006 | Duri et al. | | |
| 2006/0046709 A1* | 3/2006 | Krumm | | H04N 21/4126 |
| | | | | 455/422.1 |
| 2007/0159330 A1 | 7/2007 | Chakraborty et al. | | |
| 2007/0242643 A1* | 10/2007 | Chandra | | H04H 20/61 |
| | | | | 370/338 |
| 2007/0244750 A1 | 10/2007 | Grannan et al. | | |
| 2008/0140520 A1 | 6/2008 | Hyder et al. | | |
| 2008/0201733 A1 | 8/2008 | Ertugrul et al. | | |
| 2008/0280624 A1* | 11/2008 | Wrappe | | G01S 5/0036 |
| | | | | 455/456.1 |
| 2008/0297354 A1 | 12/2008 | Foley et al. | | |
| 2010/0007485 A1* | 1/2010 | Kodrin | | G01S 5/186 |
| | | | | 340/539.13 |
| 2010/0082427 A1 | 4/2010 | Burgener et al. | | |
| 2011/0028093 A1* | 2/2011 | Patel | | H04B 17/27 |
| | | | | 455/41.2 |
| 2011/0028160 A1* | 2/2011 | Roeding | | H04W 4/02 |
| | | | | 455/456.1 |
| 2011/0029364 A1* | 2/2011 | Roeding | | G06Q 30/00 |
| | | | | 705/14.27 |
| 2011/0029370 A1* | 2/2011 | Roeding | | H04W 4/021 |
| | | | | 705/14.38 |
| 2011/0035270 A1 | 2/2011 | Matsunaga et al. | | |
| 2011/0145049 A1 | 6/2011 | Hertel et al. | | |
| 2011/0154049 A1 | 6/2011 | Hsieh | | |
| 2011/0163231 A1 | 7/2011 | Salmon | | |
| 2012/0158513 A1 | 6/2012 | Schoen et al. | | |
| 2012/0271715 A1 | 10/2012 | Morton et al. | | |
| 2012/0323685 A1 | 12/2012 | Ullah | | |
| 2013/0030918 A1* | 1/2013 | Mourya | | G06Q 30/02 |
| | | | | 705/14.58 |
| 2013/0041752 A1 | 2/2013 | Crum | | |
| 2013/0226704 A1 | 8/2013 | Fernandez | | |
| 2013/0282438 A1* | 10/2013 | Hunter | | G01S 1/02 |
| | | | | 705/7.32 |
| 2014/0108108 A1* | 4/2014 | Artman | | G06Q 30/0261 |
| | | | | 705/14.1 |
| 2014/0135042 A1* | 5/2014 | Buchheim | | H04W 4/023 |
| | | | | 455/456.6 |
| 2014/0143060 A1* | 5/2014 | Fernandez | | H04W 4/029 |
| | | | | 705/14.58 |
| 2014/0220883 A1* | 8/2014 | Emigh | | H04H 20/61 |
| | | | | 455/3.01 |
| 2014/0222574 A1* | 8/2014 | Emigh | | G06Q 30/0261 |
| | | | | 455/3.06 |
| 2014/0229375 A1 | 8/2014 | Zaytzsev et al. | | |
| 2014/0278054 A1* | 9/2014 | Tidd | | G01C 21/00 |
| | | | | 701/409 |
| 2014/0279014 A1* | 9/2014 | Roka | | G06Q 30/0261 |
| | | | | 705/14.58 |
| 2014/0292720 A1 | 10/2014 | Liang | | |
| 2015/0025967 A1 | 1/2015 | Ellison | | |
| 2015/0032647 A1 | 1/2015 | Lachman | | |
| 2015/0052002 A1 | 2/2015 | Welch et al. | | |
| 2015/0079942 A1* | 3/2015 | Kostka | | G06Q 30/0267 |
| | | | | 455/411 |
| 2015/0142551 A1 | 5/2015 | Papakipos et al. | | |
| 2015/0161714 A1 | 6/2015 | Fainshtein | | |
| 2015/0178822 A1* | 6/2015 | Babiarz | | G06Q 30/00 |
| | | | | 705/26.7 |
| 2015/0242888 A1* | 8/2015 | Zises | | G06Q 30/0252 |
| | | | | 705/14.5 |
| 2015/0242899 A1 | 8/2015 | Farhi | | |

(56) References Cited

U.S. PATENT DOCUMENTS

| | | | |
|---|---|---|---|
| 2015/0248702 A1* | 9/2015 | Chatterton | G06Q 30/0261 705/14.58 |
| 2015/0254704 A1* | 9/2015 | Kothe | G06Q 30/06 705/14.26 |
| 2015/0278888 A1 | 10/2015 | Lu et al. | |
| 2016/0142879 A1* | 5/2016 | Walden | H04W 4/50 455/456.3 |

FOREIGN PATENT DOCUMENTS

| | | | | |
|---|---|---|---|---|
| JP | 2015-136044 A | | 7/2015 | |
| JP | 2015136044 A | * | 7/2015 | H04B 7/26 |
| WO | WO-2015080841 A1 | * | 6/2015 | G06Q 10/0633 |
| WO | WO-2015116321 A1 | * | 8/2015 | G06Q 30/0623 |
| WO | WO-2015156960 A1 | * | 10/2015 | G06Q 20/227 |

OTHER PUBLICATIONS

GSMA. A Guide to Bluetooth Beacons. (Sep. 2014). Retrieved online Sep. 21, 2019. https://www.gsma.com/digitalcommerce/wp-content/uploads/2013/10/A-guide-to-BLE-beacons-FINAL-18-Sept-14.pdf (Year: 2014).*

SITA. Connectingto Passengers—Are Beacons the Breakthrough? (May 14, 2014). Retrieved online Dec. 13, 2021. https://www.futuretravelexperience.com/wp-content/uploads/2014/03/insight-paper-beacons.pdf (Year: 2014).*

"How to write Adevertisement That Sell,"System, The Magazine of Business Copyright 1912 by A.W. Shaw Company.

"How to Write Advertisements That Sell", by System, The Magazine of Business, Copyright 1912, by A.W. Shaw Company (book images scanned).

U.S. Appl. No. 14/248,676, filed Apr. 9, 2014; In re: Krishna et al., entitled Communication Beacon Based Promotions for Mobile Devices.

U.S. Appl. No. 14/312,588, filed Jun. 23, 2014, In re: Kim, entitled Seamless Promotion Redemption.

U.S. Appl. No. 14/454,673, filed Aug. 7, 2014; In re: Krishna et al., entitled Communication Beacon Based Promotions for Mobile Devices.

U.S. Provisional Patent Application as filed Sep. 27, 2013, U.S. Appl. No. 61/883,846.

* cited by examiner

SEAMLESS PROMOTION REDEMPTION

CROSS REFERENCE TO RELATED APPLICATIONS

This application is a continuation of U.S. patent application Ser. No. 14/312,588, titled "Seamless Promotion Redemption," filed Jun. 23, 2014, which is a continuation-in-part of U.S. patent application Ser. No. 14/248,676, titled "Communication Beacon Based Promotions for Mobile Devices," filed Apr. 9, 2014, both of which are incorporated by reference herein in their entirety.

FIELD

Embodiments of the invention relate, generally, to providing promotional offers and redemptions to consumers based on communications with consumer devices.

BACKGROUND

Consumers near commercial areas may traverse past many different merchants, some direct competitors or otherwise. Enticing consumers to stop at, consider, or enter a merchant shop can be an important aspect of generating business at a brick-and-mortar location. Furthermore, consumer merchant interactions may be improved to facilitate experiences that grow repeat customers. In this regard, among others, areas for improving current systems have been identified. Through applied effort, ingenuity, and innovation, solutions to improve such systems have been realized and are described herein.

BRIEF SUMMARY

Systems, methods, and computer readable program code are provided to facilitate interactions between merchants and consumers. Some embodiments may provide for a system including a communication beacon and one or more servers. The communication beacon may be configured to communicate with a consumer device via a direct wireless connection when the consumer device is within a wireless direct communicable range of the communication beacon. The one or more servers may be configured to: associate the communication beacon with a merchant; receive consumer presence data from the communication beacon indicating that the consumer device and the communication beacon has formed the direct wireless connection; and in response receiving the consumer presence data: determine a redeemable promotion of a consumer associated with the consumer device, the redeemable promotion being redeemable at the merchant; and provide an indication of the redeemable promotion to the consumer device.

In some embodiments, the one or more servers may be further configured to, subsequent to receiving the consumer presence data, provide an indication of the redeemable promotion to a merchant device associated with the merchant.

In some embodiments, the merchant device may include the communication beacon.

In some embodiments, the one or more servers may be further configured to provide a merchant interface to the merchant device, the merchant interface including the indication of the redeemable promotion. In some embodiments, the merchant interface may include an indication of consumer identifying data that identifies the consumer associated with the consumer device In some embodiments, the one or more servers may be further configured to: provide to the merchant interface an indication of consumer identifying data associated with one or more consumers with consumer devices having direct wireless connections with the communication beacon, the one or more consumers including the consumer; receive a selection of consumer identifying data associated with the consumer; and in response to receiving the selection of the consumer identifying data, provide the indication of the redeemable promotion to the merchant interface. In some embodiments, the indication of consumer identifying data associated with the consumer may include at least one of a consumer name and a consumer image.

In some embodiments, the indication of the redeemable promotion may include a redeem button. The one or more servers may be further configured to: receive an instruction to redeem the redeemable promotion from the merchant device based on a selection of the redeem button; and in response to receiving the instruction to redeem the redeemable promotion, facilitate redemption of the redeemable promotion.

In some embodiments, the one or more servers configured to facilitate the redemption of the redeemable promotion may include the one or more servers being configured to facilitate the redemption without requiring a redeem instruction from the consumer device.

In some embodiments, the one or more servers configured to facilitate the redemption of the redeemable promotion may include the one or more servers being configured to at least one of: deduct a promotional value of the redeemable promotion from a total cost of a transaction; and disassociate the redeemable promotion with a consumer account of the consumer.

Some embodiments may provide for a machine-implemented method. The method may include: associating, by circuitry, a communication beacon with a merchant; receiving, by the circuitry, consumer presence data from the communication beacon indicating that a consumer device and the communication beacon has formed a direct wireless connection when the consumer device is within a wireless direct communicable range of the communication beacon; and in response receiving the consumer presence data, and by the circuitry: determining a redeemable promotion of a consumer associated with the consumer device, the redeemable promotion being redeemable at the merchant; and providing an indication of the redeemable promotion to the consumer device.

In some embodiments, the method may further include, by the circuitry and subsequent to receiving the consumer presence data, providing an indication of the redeemable promotion to a merchant device associated with the merchant.

In some embodiments, the merchant device may include the communication beacon.

In some embodiments, the method may further include, by the circuitry, providing a merchant interface to the merchant device, the merchant interface including the indication of the redeemable promotion. In some embodiments, the merchant interface may further include an indication of consumer identifying data that identifies the consumer associated with the consumer device. In some embodiments, the method may further include, by the circuitry: providing to the merchant interface an indication of consumer identifying data associated with one or more consumers with consumer devices having direct wireless connections with the communication beacon, the one or more consumers including the consumer; receiving a selection of consumer identifying data associated with the consumer; and in response to receiving the selection of the consumer identifying data, providing the indication of the redeemable promotion to the merchant interface. In some embodiments, the indication of consumer identifying data associated with the consumer may include at least one of a consumer name and a consumer image.

In some embodiments, the indication of the redeemable promotion includes a redeem button. The method may further include: receiving an instruction to redeem the redeemable promotion from the merchant device based on a selection of the redeem button; and in response to receiving the instruction to redeem the redeemable promotion, facilitating redemption of the redeemable promotion.

In some embodiments, facilitating the redemption of the redeemable promotion may include facilitating the redemption without requiring a redeem instruction from the consumer device. In some embodiments, facilitating the redemption of the redeemable promotion includes at least one of: deducting a promotional value of the redeemable promotion from a total cost of a transaction; and disassociating the redeemable promotion with a consumer account of the consumer.

Other embodiments may include one or more machines, such as an apparatus, device, and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details are described below. Similarly, corresponding and additional embodiments are also described below.

BRIEF DESCRIPTION OF THE DRAWINGS

Figure 1:
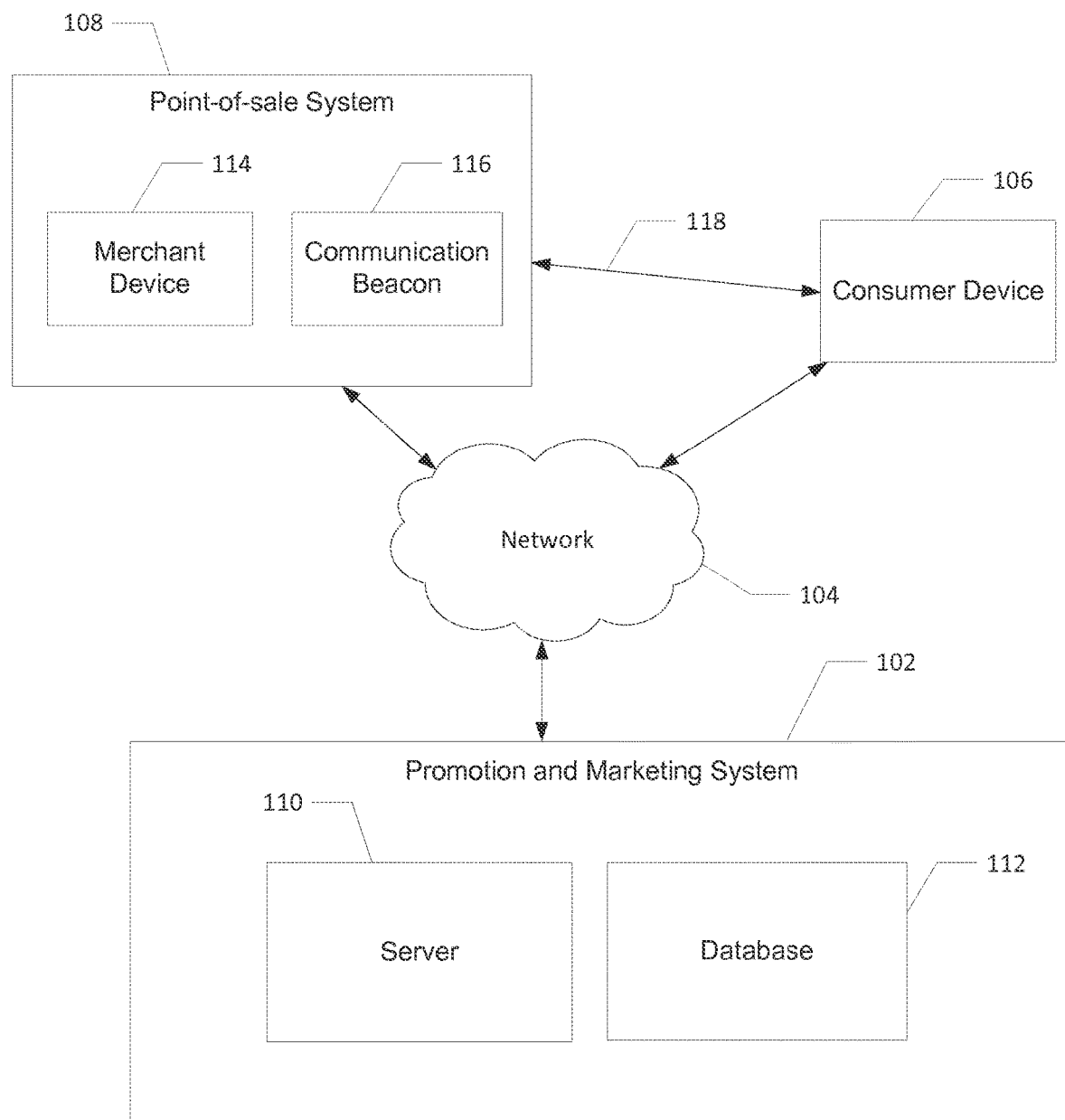
Figure 2:
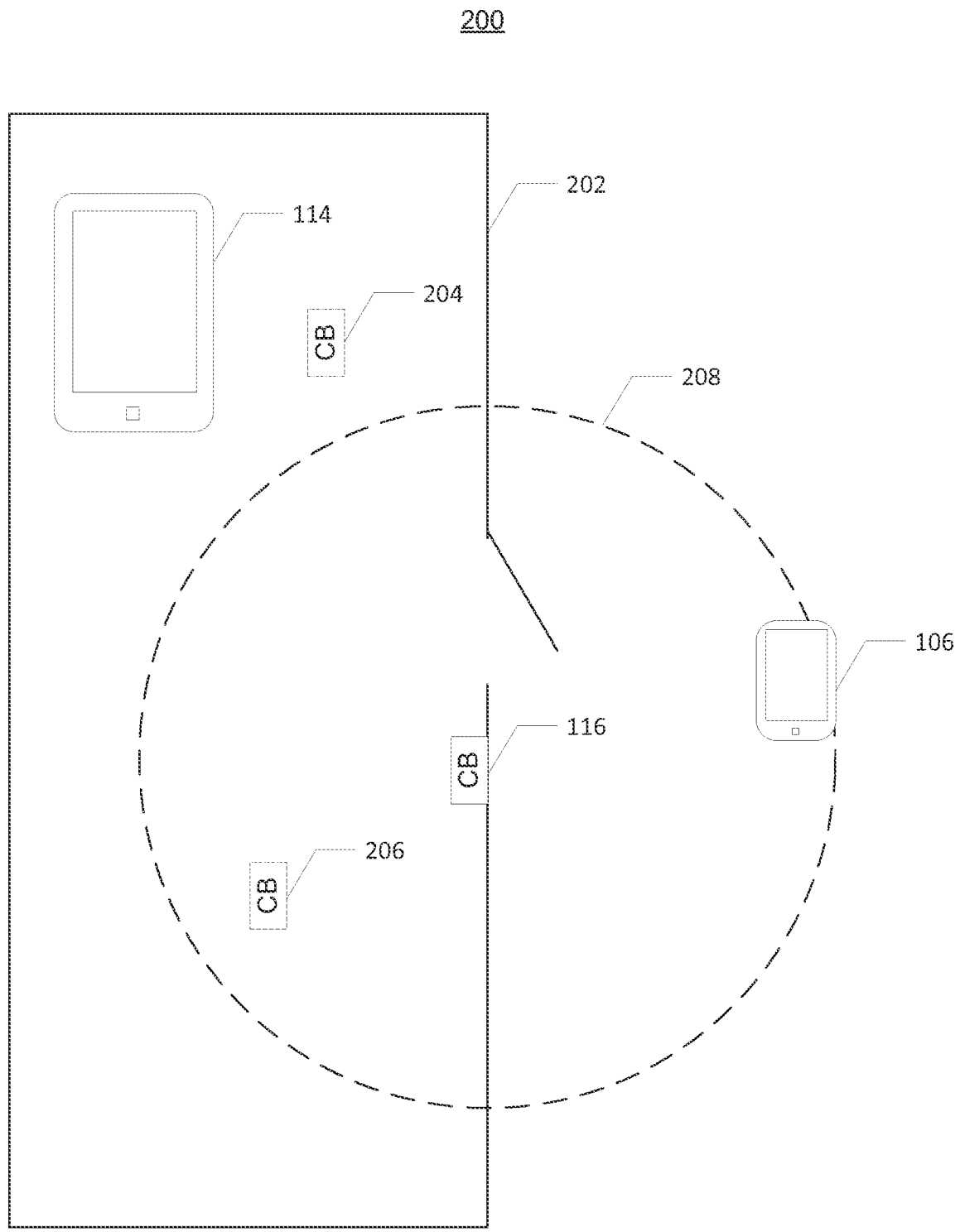
Figure 3:
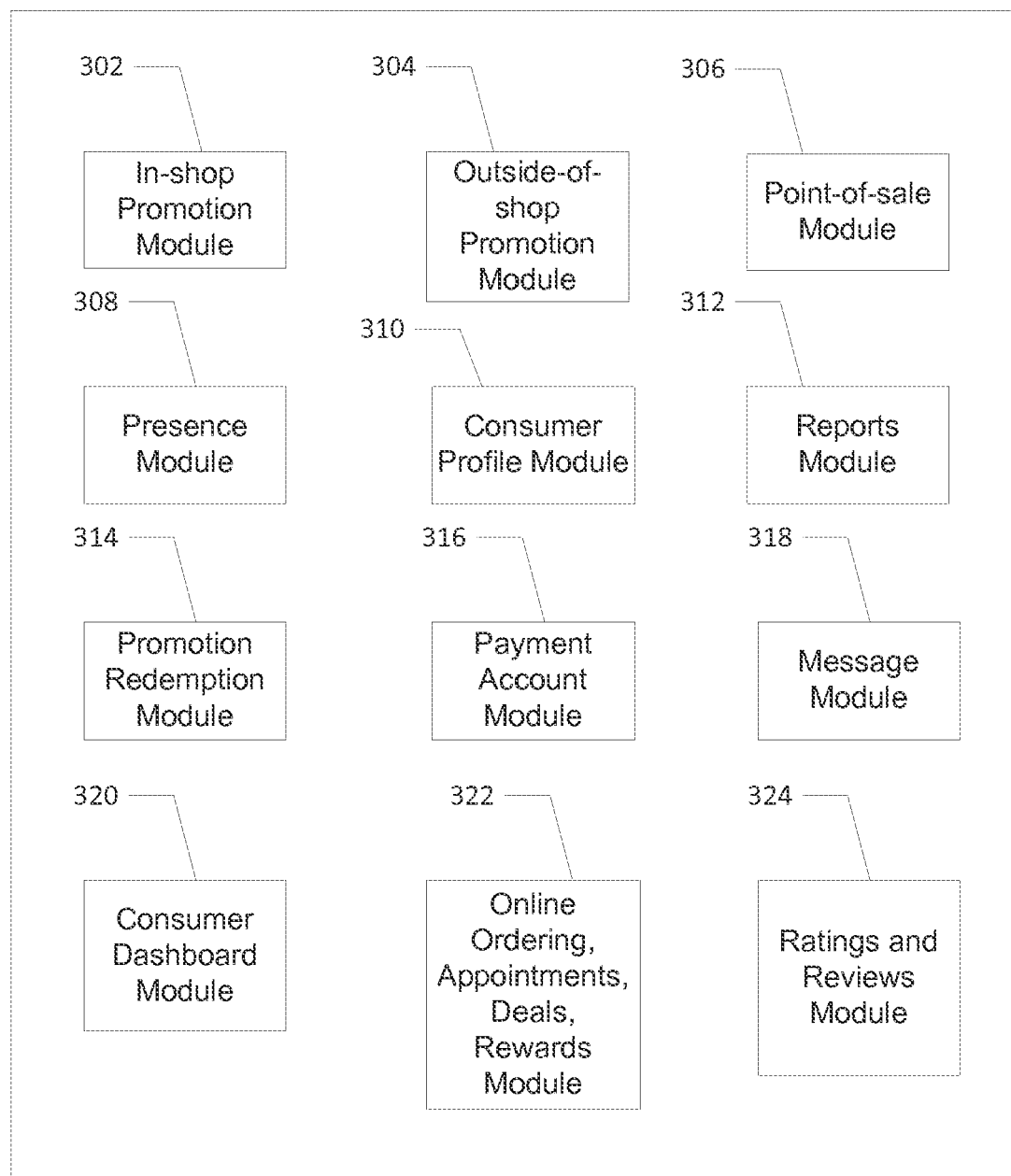
Figure 4:
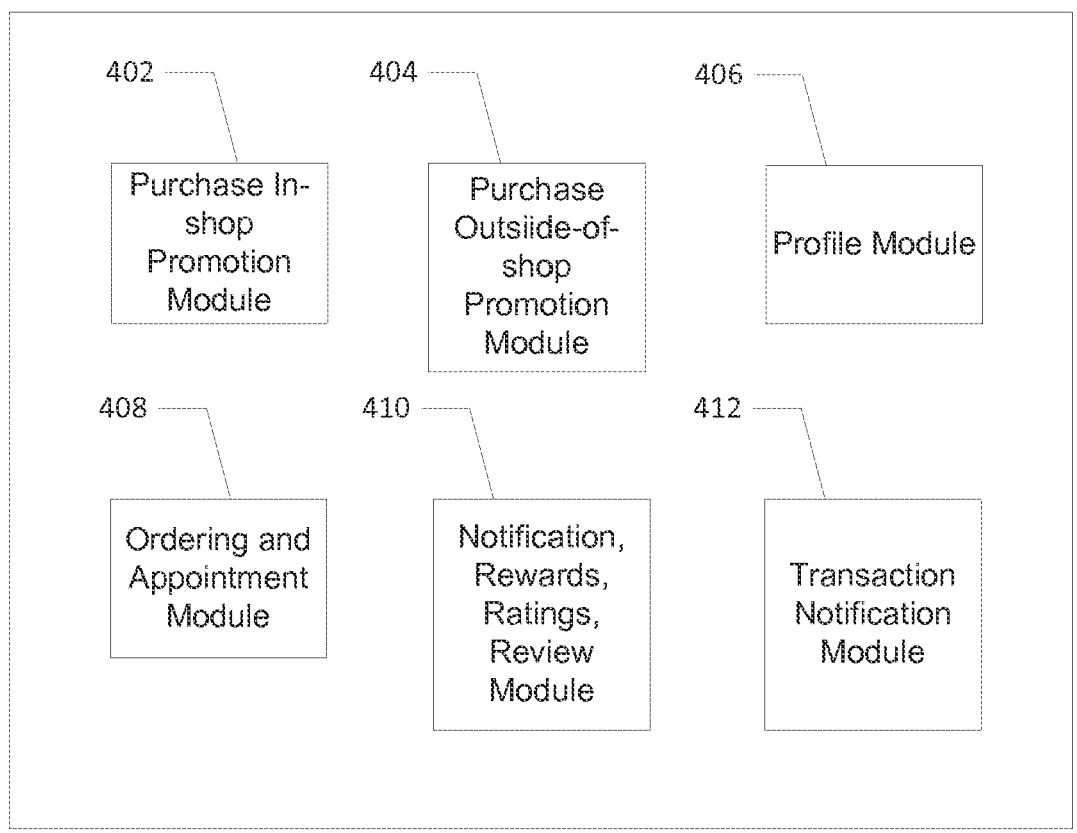
Figure 5:
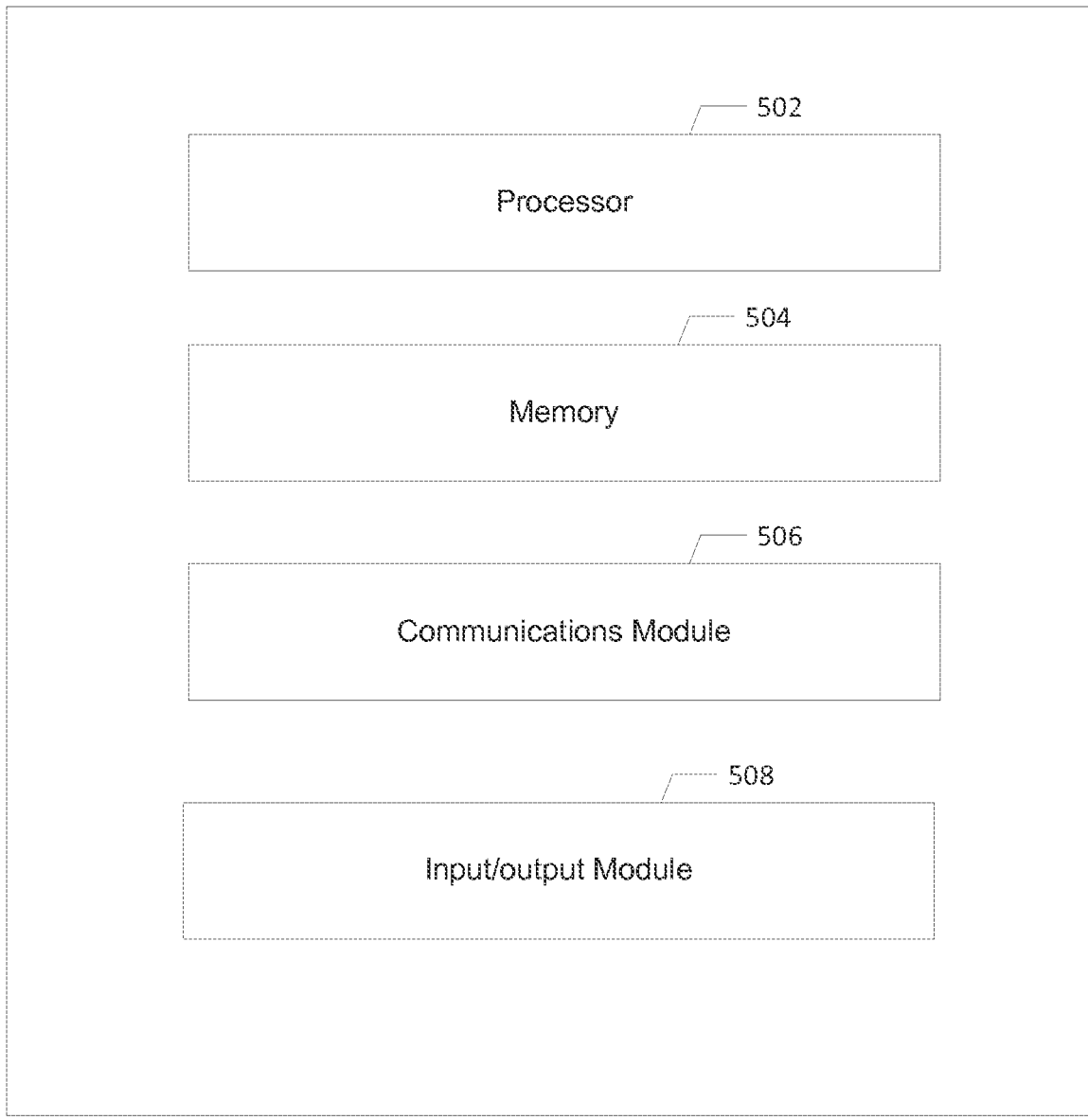
Figure 6:
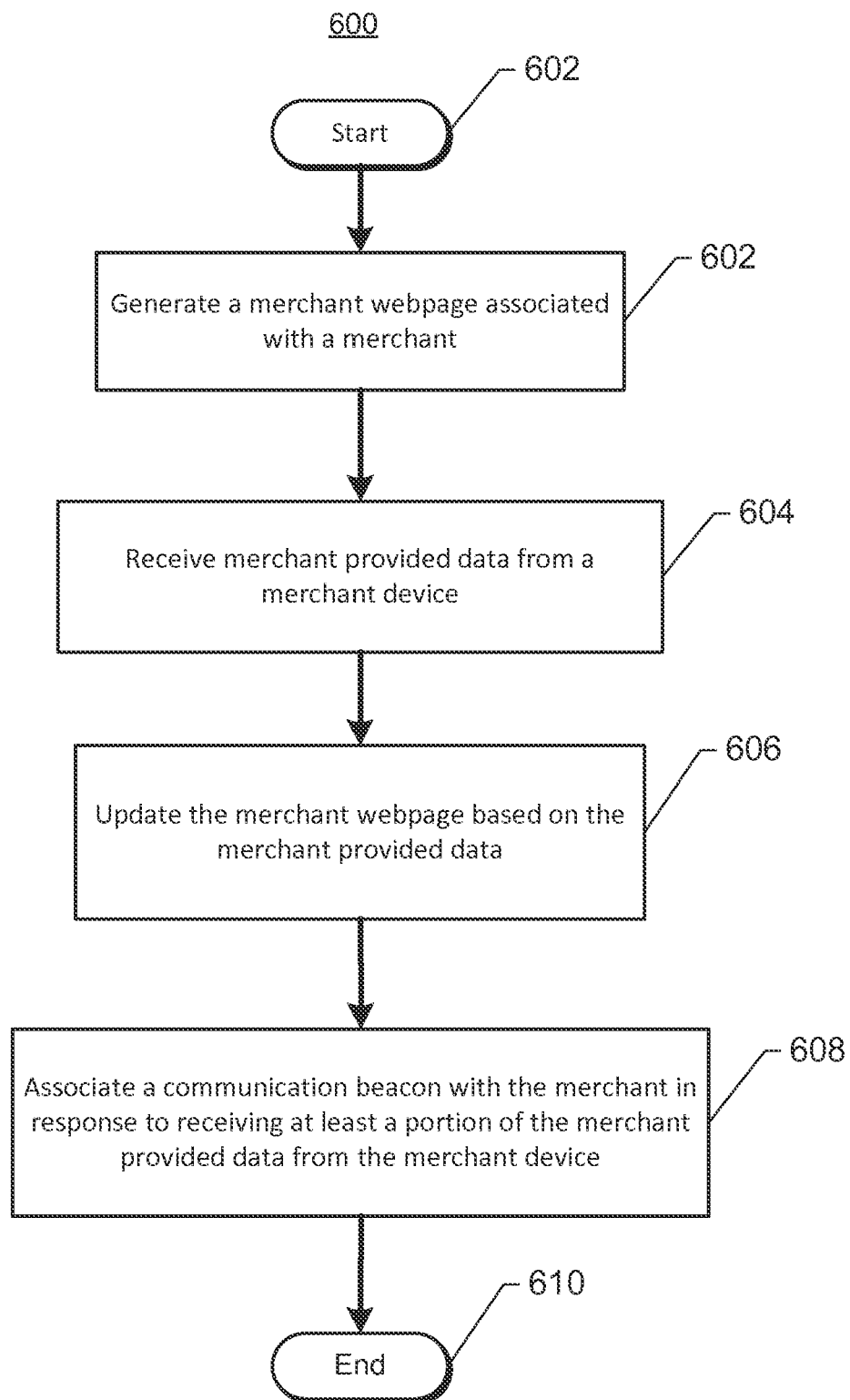
Figure 7:
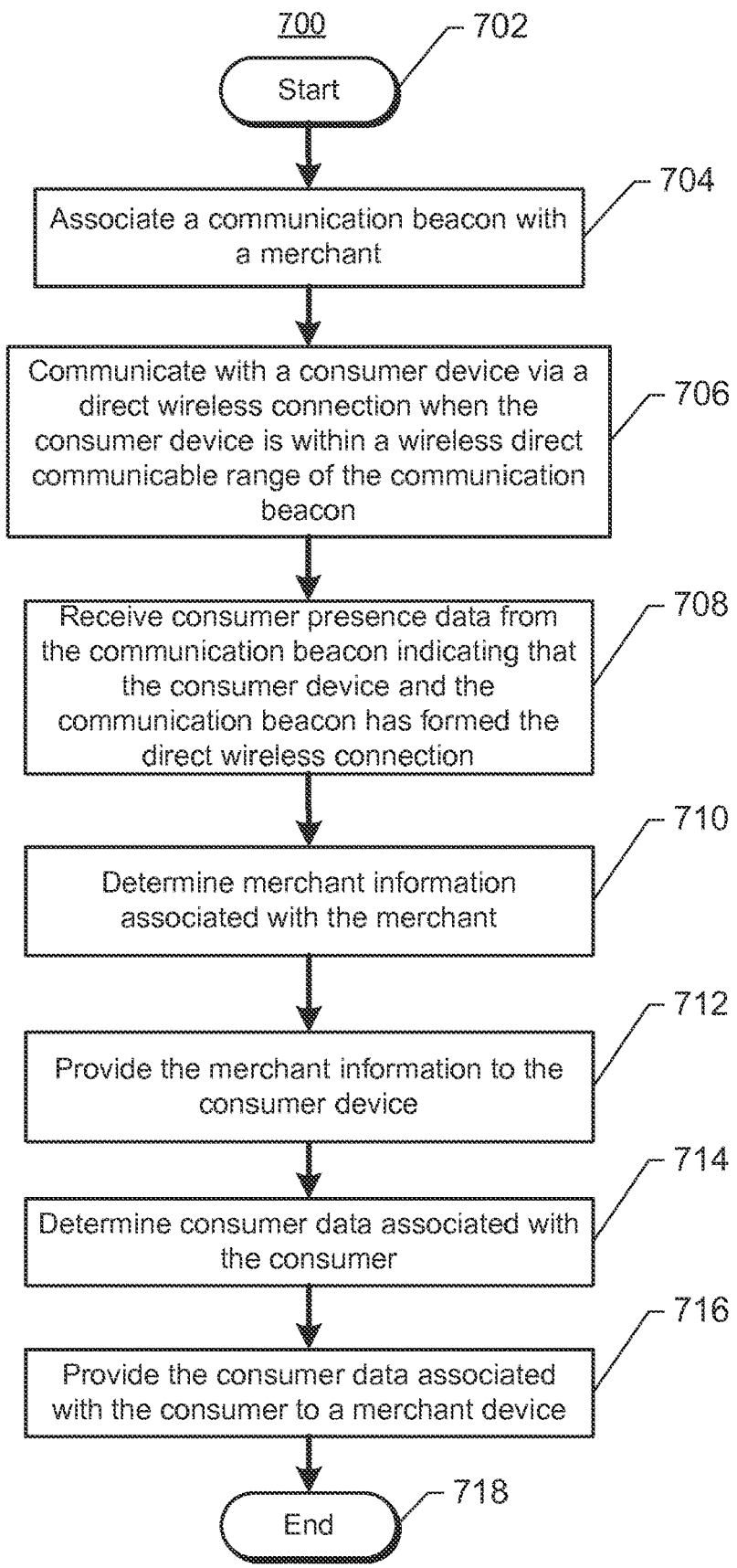
Figure 8:
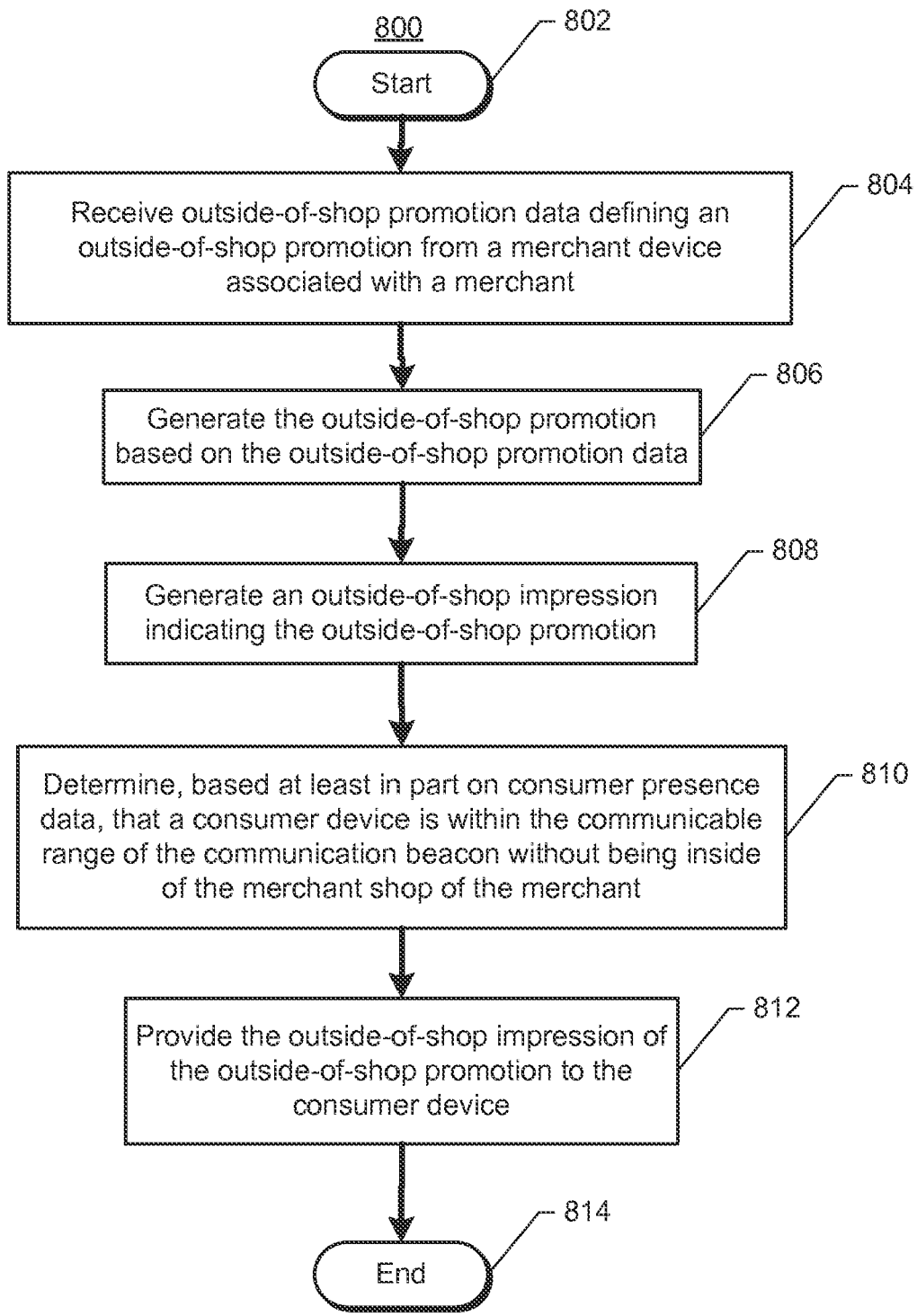
Figure 9:
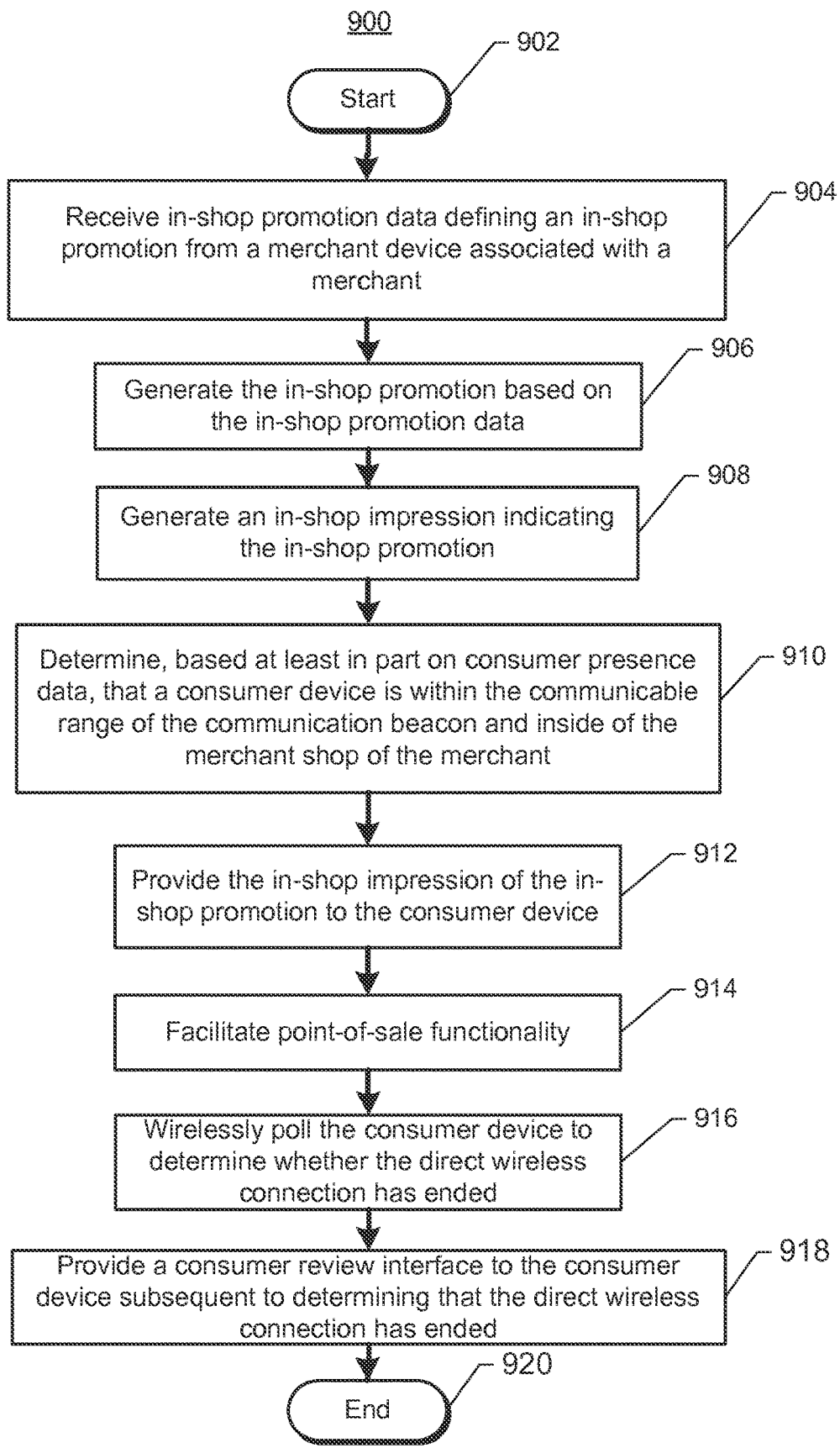
Figure 10:
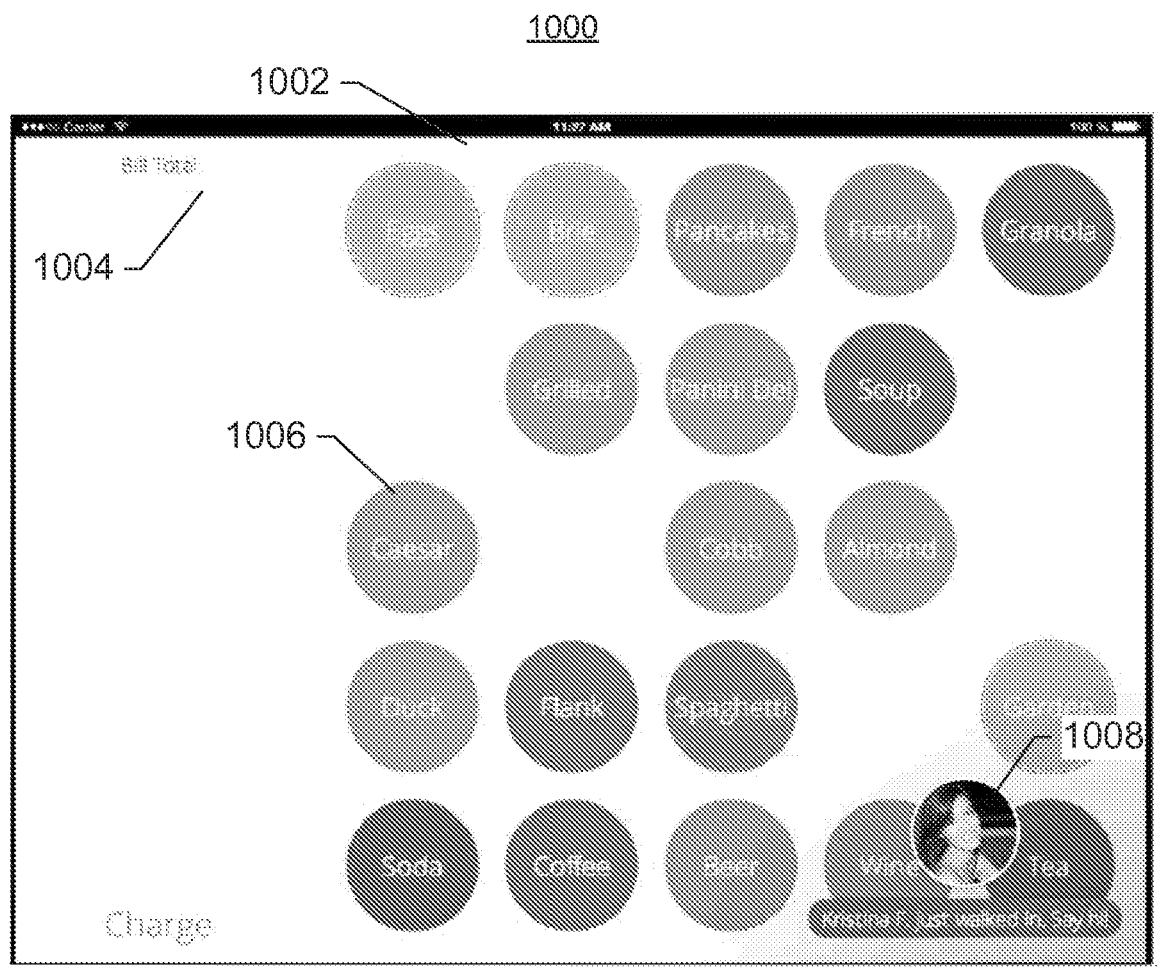
Figure 11:
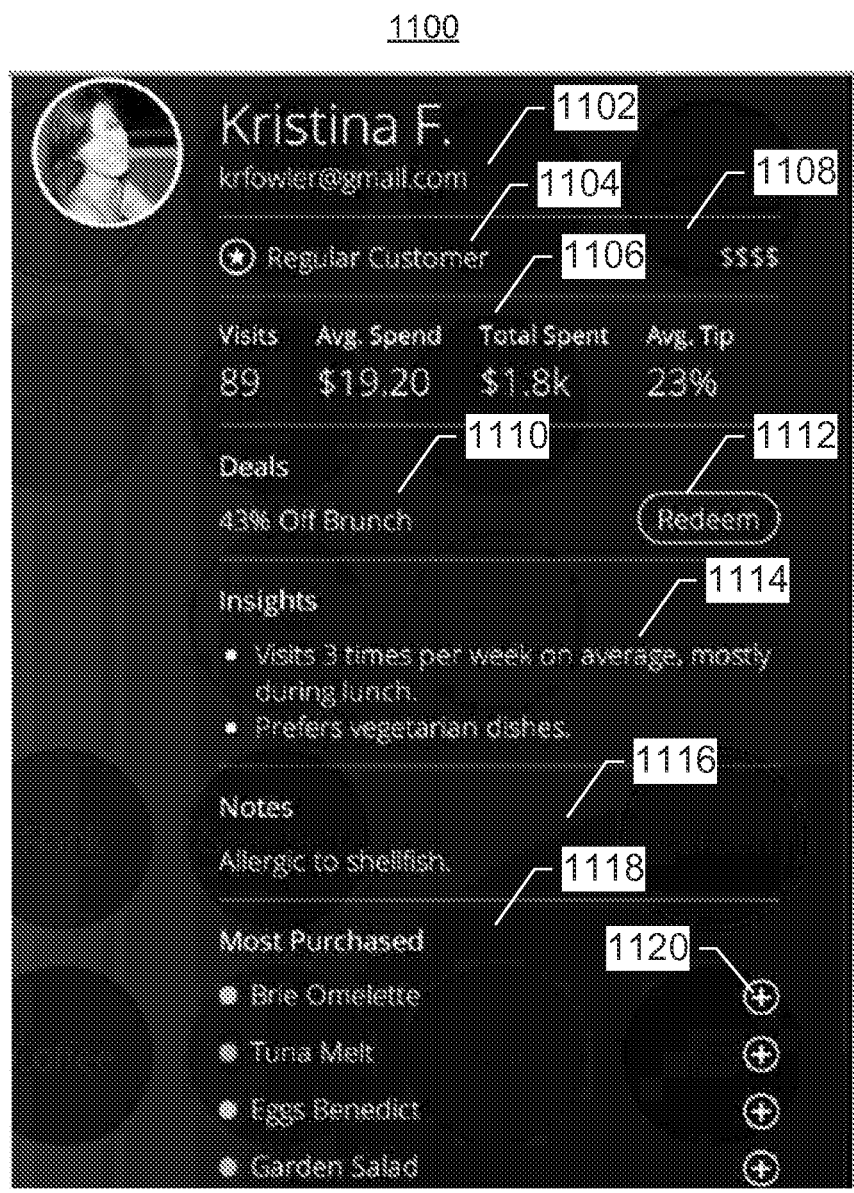
Figure 12:
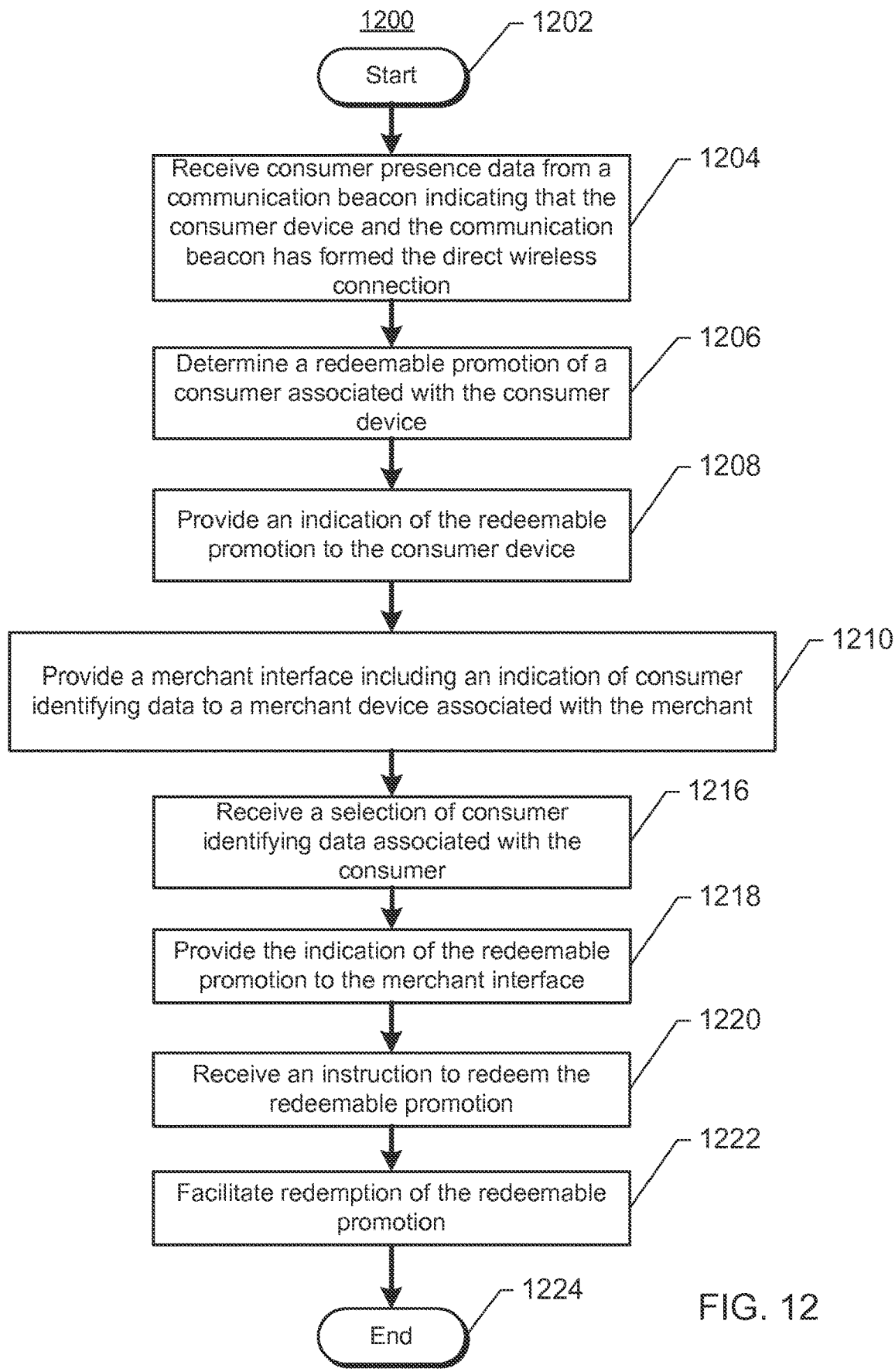
Figure 13:
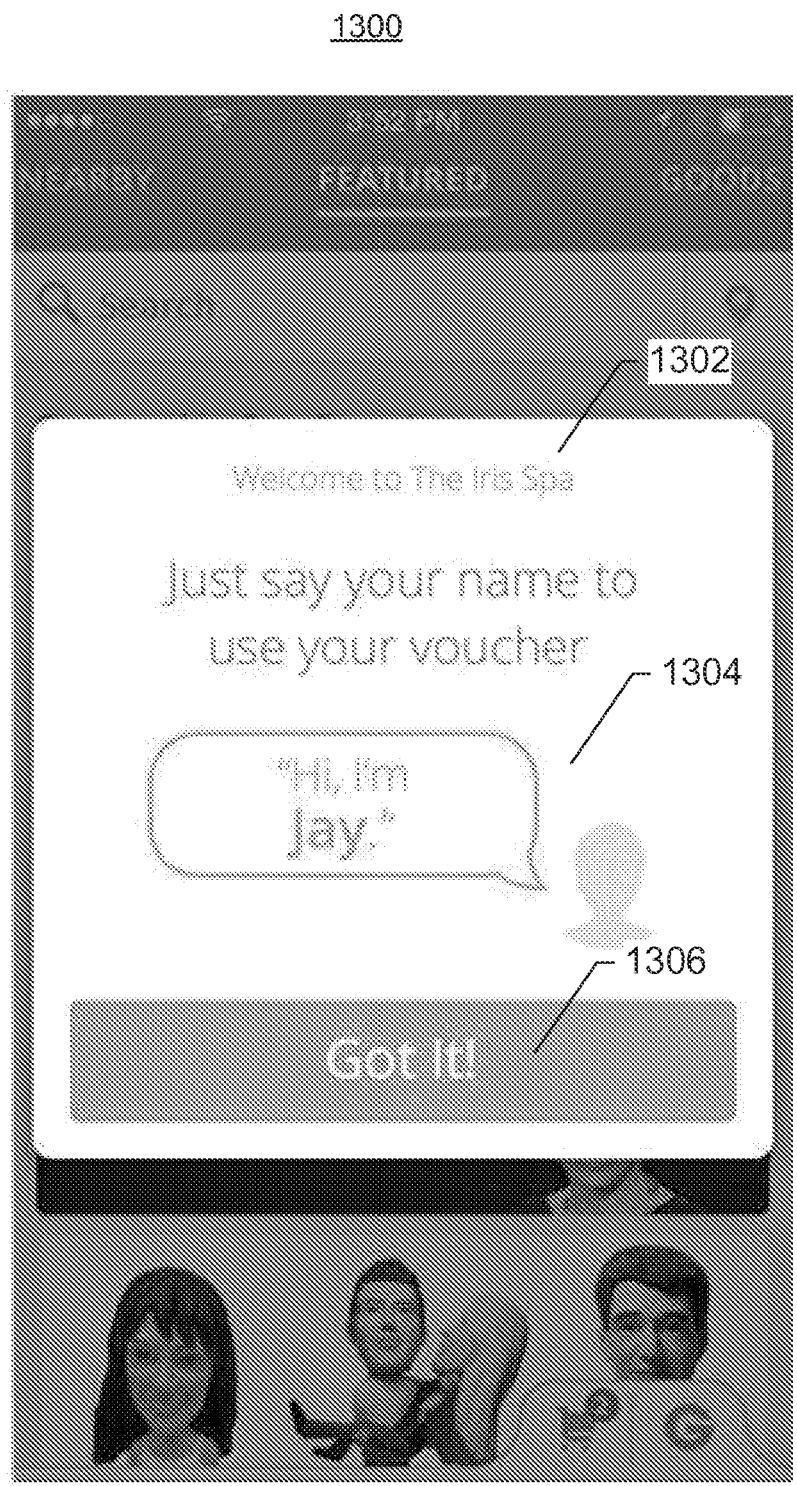
Figure 14:
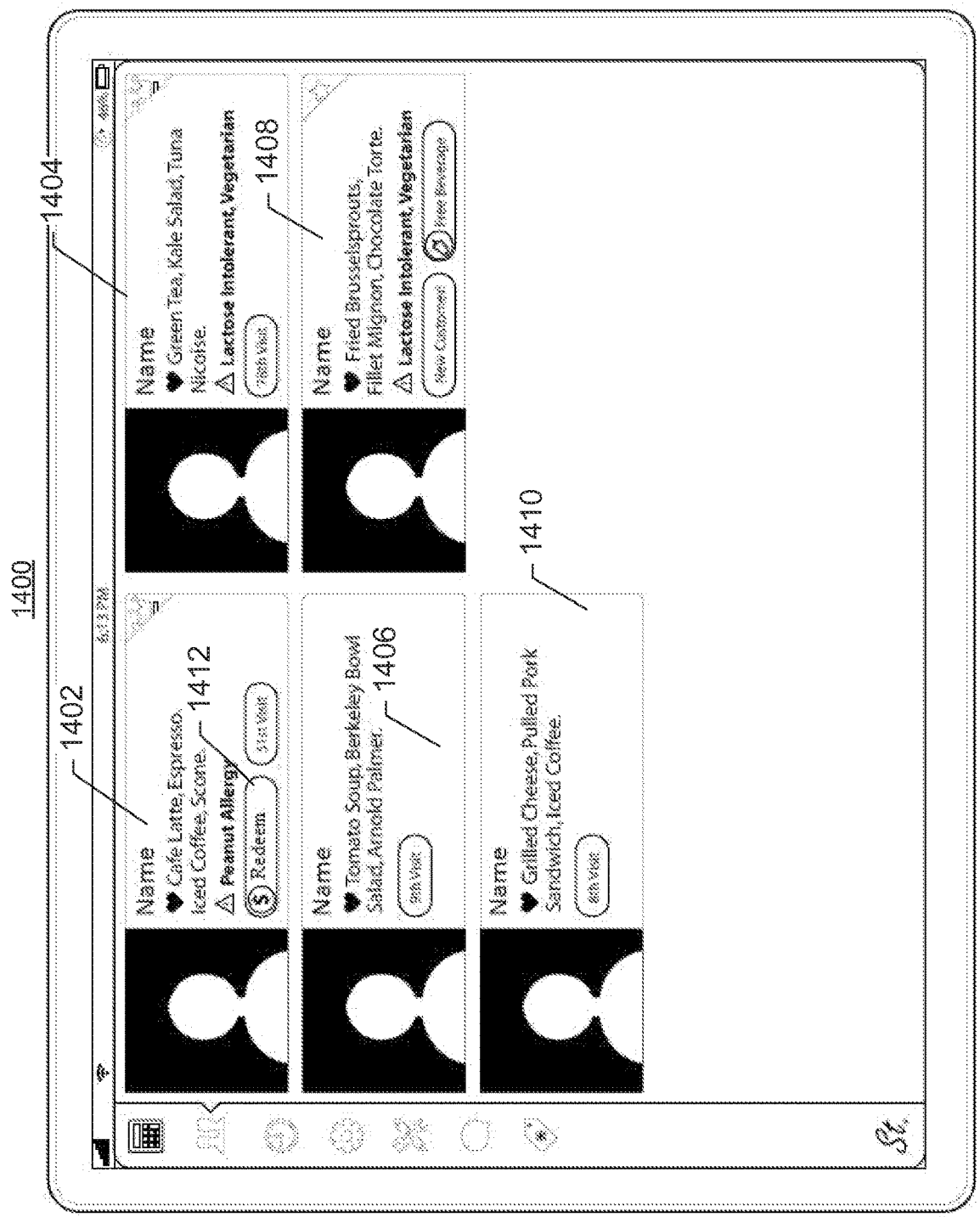

Having thus described some embodiments in general terms, reference will now be made to the accompanying drawings, which are not necessarily drawn to scale, and wherein:

FIG. 1 shows an example of a system in accordance with some embodiments;

FIG. 2 shows an example of a point-of-sale system in accordance with some embodiments;

FIG. 3 shows an example of a merchant device in accordance with some embodiments;

FIG. 4 shows an example of a consumer device in accordance with some embodiments;

FIG. 5 shows a schematic block diagram of example circuitry in accordance with some embodiments;

FIG. 6 shows an example of a method of associating a communication beacon with a merchant in accordance with some embodiments;

FIG. 7 shows an example of a method of communicating with a consumer device with a communication beacon in accordance with some embodiments;

FIG. 8 shows an example of a method of providing an outside-of-shop promotion to a consumer in accordance with some embodiments;

FIG. 9 shows an example of a method of facilitating in-shop consumer and merchant interactions in accordance with some embodiments;

FIG. 10 shows an example of a presence display in accordance with some embodiments;

FIG. 11 shows an example of a consumer profile in accordance with some embodiments;

FIG. 12 shows an example of a method of redeeming a promotion in accordance with some embodiments;

FIG. 13 shows an example of a redeemable promotion display in accordance with some embodiments; and FIG. 14 shows an example of consumer display in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Some embodiments may provide for a central system (e.g., one or more servers) configured to provide a promotional and marketing service for one or more (e.g., multiple) merchants. Each merchant may be associated with a merchant shop (e.g., a brick-and-mortar retail location, restaurant, etc.). One or more communication beacons may be strategically located at the merchant shop to detect the presence of consumer devices (e.g., and thereby consumers carrying such consumer devices), including consumer devices that traverse past the merchant shop and consumer devices that enter the merchant shop. The merchant may further be associated with a merchant device (e.g., which may also include point-of-sale functionality, among other things), which in some embodiments may be the same device as the communication beacon.

The merchant device and/or communication beacon may be configured to communicate with the system for various functionalities. For example, a communication beacon may be located on a merchant shop window, wall, door, etc. and configured to receive wallet identifying data (and/or other data that identifies a particular consumer) from consumer devices as they pass near an entrance of the merchant shop. The communication beacon maybe configured to form wireless direct connections with the consumer devices. Based on programmatically processing the signals between the communication beacon and consumer devices, information regarding consumer behavior near or at a merchant shop may be tracked for the merchant. For example, information about a particular consumer (e.g., identified via the wallet identifying data) may be provided to the merchant device to facilitate consumer assistance such as profile information, preferences, visitation data, spending amounts, among other things. The merchant device may further receive consumer analytical data aggregated based on tracking multiple consumers, such as the number of consumers that pass by the merchant shop, the number of consumers that enter the merchant shop, average duration or money spent per visit, etc.

Some embodiments may allow the merchant to communicate to consumers via consumer devices, such as for attracting consumers outside of the merchant shop (e.g., to enter) or within the merchant shop (e.g., to purchase a particular item). For example, when the consumer device is determined to be near but outside of the merchant shop, an outside-of-shop impression indicating one or more outside-of-shop promotions may be provided to the consumer device. In some embodiments, the outside-of-shop promotion may be defined by the merchant and pushed out (e.g., in real-time) to consumer devices based on presence detection via the communication beacon. In some embodiments, when the consumer device is determined to be inside of the merchant shop, an in-shop impression indicating one or more in-shop promotions may additionally or alternatively provided to the consumer device. Various other functionalities may also be triggered based on consumer device location, such as providing a menu to the consumer device, consumer device ordering, point-of-sale with the merchant device, promotion purchase and redemption. etc.

A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences (or "item(s)" as used herein) defined by the promotion. For example, a promotion may specify that for a $25 accepted value paid by the consumer, the consumer may receive $50 toward a purchase of running shoes at a particular merchant.

A promotion may be defined by and/or be associated with one or more "promotion parameters." Example promotion parameters may include an accepted value (e.g., a cost to purchase the promotion), a promotional value (e.g., the value of the resultant instrument beyond the accepted value), and/or the associated item or items of the promotion. In some embodiments, a promotion may further be associated with a promotion availability value indicating a number of instances of the promotion that is available to consumers (e.g., in total, within a predetermined period of time such as daily, weekly, monthly, yearly, etc.).

A "merchant" or "provider" may include, but is not limited to, a merchant, provider of a promotion, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce.

In some embodiments, one or more "impressions" of a promotion may be provided to consumers or consumer devices. An "impression," as used herein, may include a communication, a display, or other perceived indication, such as a flyer, print media, e-mail, text message, application alert, mobile applications, other type of electronic interface or distribution channel and/or the like, of one or more promotions. For example, and using the aforementioned running shoe promotion, an impression may include an e-mail communication sent to consumer devices of consumers that indicates the availability of the $25 for $50 toward running shoes promotion.

An impression may be provided to consumer devices in any suitable way, including via a network such as the Internet. In some embodiments, in-shop and outside-of-shop impressions may be provided to a consumer device based on presence detection and/or location determination of the consumer device with one or more communication beacons located near a merchant shop. As used herein, an outside-of-shop impression may refer to an impression of an outside-of-shop promotion that may be provided to a consumer device while the consumer device is determined to be within a communicable range of a communication beacon and outside of a merchant shop. In that sense, an outside-of-shop promotion may refer to a promotion that is offered to a consumer while the consumer is near but outside of a merchant shop. An in-shop impression may refer to an impression of an in-shop promotion that may be provided to a consumer device while the consumer device is determined to be within a communicable range of a communication beacon and inside of a merchant shop. As discussed in greater detail herein, the promotion parameters of an outside-of-shop impression and in-shop impression may be varied to facilitate various consumer behaviors.

Some embodiments may provide for seamless transactions, which may include seamless promotion redemptions and/or payment. For example, consumers may be allowed to provide login data or otherwise associated a consumer device with a consumer account at a central system and/or server. Based on communications between a consumer device and communication beacon, among other things, the server may determine the location of the consumer as being at a particular merchant. The server may then determine redeemable promotions of the consumer at the merchant and provide an indication of one or more redeemable promotions to the consumer. Furthermore, the server may then send the consumer's information, including data indicating the redeemable promotion to a merchant device associated with the merchant. The data sent to the consumer device and merchant device may include a message, phase, code, etc. that can be used by the consumer to identify the instance of consumer data that has been provided to the merchant device (e.g., of many potential instances created for each consumer device that is at the merchant shop). For example, the message to consumer device may include a direction for the consumer to tell a merchant the consumer's name, which may correspond with a message to the merchant including the consumer's name that is displayed on the merchant device. As such, the merchant is able to correlate a live consumer (e.g., at dine-in restaurant, checkout, bar, etc.) to seamlessly assist the consumer in a secure transaction where the consumer can be identified and authenticated by simply carrying the consumer device to the merchant shop. In addition or alternative to redeemable promotions, payment data may also be associated with the consumer account. In that sense, the system is capable of completing a transaction between the consumer and merchant that is seamless, requiring no consumer inputs to the server, presentation of an instrument or voucher for redemption, or conventional forms of payment.

Exemplary System Architecture

FIG. 1 shows an example system 100 in accordance with some embodiments. System 100 may include promotion and marketing system 102 (or "system 102"), network 104, consumer device 106, and point-of-sale system 108. System 102 may be communicably connected with consumer device 106 and point-of-sale system 108 via network 104.

Point-of-sale system 108 may include merchant device 114 and communication beacon 116. Point-of-sale system 108 may be associated with a merchant and may be located at a merchant shop. A "merchant," as used herein may include, but is not limited to, a promotion provider, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a merchant may take the form of a running company that sells attire that is generally used by a person who runs or participates in athletic activities. Although a single merchant device 114 and communication beacon 116 are shown, point-of-sale system 108 may include any number of merchant devices and/or communication beacons. In some embodiments, system 100 may further include multiple point-of-sale systems 108 that may be associated with various other merchants and/or merchant shops. In some embodiments, merchant device 114 may be configured to provide point-of-sale (POS) functionality for the merchant. Furthermore, merchant device 114 may be a stationary and/or mobile device. In some embodiments, merchant device 114 and/or communication beacon 116 may include circuitry configured to programmatically perform some or all of the methods discussed herein, such as methods 500-900 shown in FIGS. 5-9, respectively.

In some embodiments, system 100 may further include promotion and marketing system 102, which may further include server 110 and database 112. In some embodiments, system 102 may be configured to provide a promotion and marketing service that is accessible via one or more consumer devices and is operable to provide example promotion and/or marketing services on behalf of one or more merchants and/or providers that are offering one or more instruments that are redeemable for goods, services, experiences and/or the like. The promotion and marketing service maybe further be configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

Server 110 may include circuitry, networked processors, etc. configured to perform some or all of the server-based processes described herein and may be any suitable network server and/or other type of processing device. For example, server 110 may be configured to provide consumer accounts (e.g., including associated payment accounts of consumers that may be used with point-of-sale system 108), provide impressions or other advertising messages to consumer devices 108, and/or facilitate the offer, purchase, and/or redemption (e.g., at the merchant shop) of promotions. In some embodiments, system 102 may function as a "cloud" with respect to the consumer device 106 and/or point-of-sale system 108. In that sense, server 110 may include several servers (e.g., one or more servers) performing interconnected and/or distributed functions. To avoid unnecessarily overcomplicating the disclosure, server 110 is shown and described herein as a single server.

In some embodiments, system 102 may be configured to receive promotion data indicating a promotion for goods and/or services and/or one or more parameters of the promotion (e.g., target audience, timing, purchase value, promotional value, residual value, etc.). System 102 may then generate and/or provide one or more impressions for the promotion to consumer device 102. In some embodiments, the system may receive in-shop and/or outside-of-shop promotion data from a merchant device that defines a particular in-shop and/or outside-of-shop promotion. Based on consumer presence data received at a communication beacon, the server may be configured to provide a suitable in-shop or outside-of-shop impression to the consumer device, each of which may respectively include one or more in-shop promotions and one or more outside-of-shop promotions. In some embodiments, an in-shop promotion and outside-of-shop promotion may be different from promotions that are provided to consumer devices without consumer device presence detection (e.g., via the Internet such as email, text, mobile application, etc.). Here, specifically tailored messages may be defined for consumers near or within a merchant shop.

Database 112 may be any suitable network storage device. For example, database 112 may be configured to store promotion data (e.g., attributes of promotion, promotion parameters, etc.), consumer data (e.g., attributes of the consumer such as profile information, preferences, purchase history, consumer behavior, payment accounts, among other things), and/or purchase transaction data (e.g., payment account information, credit card information, payment information, billing address, payment account information, among other things). As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer, such as a consumer with a consumer account provided by system 102. Although a single consumer device 106 is shown, system 100 may include any number of consumer devices that may be associated with various other consumers. Consumer device 106 may be a mobile device and/or a stationary device (e.g., home computer). For example, consumer device 106 may be a mobile device such as a cellular telephone (including smartphones and/or other types of mobile telephones), laptop, tablet, electronic reader, e-book device, media device, and/or the like.

Connection 118 may include a direct wireless connection between one or more communication beacons 116 and consumer device 106. In some embodiments, based on consumer presence data received from a communication beacon 116 indicating that consumer device 106 was detected to be within a wireless direct communicable range of communication beacon 116, server 110 may be configured to communicate with merchant device 114 and consumer device 106 via network 104 to provide the various functionalities discussed herein. For example, merchant device 114 and/or communication beacon 116 may be configured to broadcast a beacon identifier via a wireless personal area network (PAN).

In some embodiments, communication beacon 116 may be configured to utilize a Bluetooth standard for the wireless communication such that Bluetooth-enabled consumer devices 106 may wirelessly connect with communication beacon 116 upon coming within communicable range of communication beacon 116. The communicable range of communication beacon may be configured to be of a range that is suitable for low power (e.g., less than 2.5 mW), high resolution distance determination within a merchant shop and/or a portion of the merchant shop. For example, the communicable range of the communication beacon using a Bluetooth standard can be within 1-10 meters, or any other suitable short range (e.g., 2, 3, 4 . . . 10, 11, etc. meters). In some embodiments, the communicable range may be configured based on the dimensions, layout, and/or other needs of a merchant shop. In some embodiments, consumer device 106 may be configured to communicate with point-of-sale system 108 via connection 118 and point-of-sale system 108, such as when consumer device 106 is within a communicable range of the wireless PAN and/or has no access to network 104.

FIG. 2 shows an example point-of-sale system 200 in accordance with some embodiments. Point-of-sale system 200 may be deployed at a merchant shop 202, which in some examples, may be a dine-in restaurant. Point-of-sale system 200 may include merchant device 114 and communication beacon 116. In some embodiments, communication beacon 116 may include an adhesive and/or other attachment such that communication beacon 116 may be affixed to a window and/or other surface of merchant shop 202. For example, communication beacon 116 may be packaged with a sticker that may be placed on an inside surface of a front-facing window, near an entrance of the merchant shop.

In some embodiments, a plurality of communication beacons 204, 206, etc. may be each located at locations of interest at, near or within the merchant shop. Here, for example, each communication beacon may be located at and/or near a dine-in location, such as a table 208, thereby forming a mesh of signal coverage within the dine-in locations. The communication beacons may be each configured to broadcast a beacon identifier via a wireless PAN, such as wireless PAN 208 for communication beacon 116. The "beacon identifier," as used herein, may refer to any type of data that may be used to uniquely identify a communication beacon. In some embodiments, a beacon identifier may include a unique identification number (i.e., a unique ID, a serial number, etc.), or may be based at least partially on, a random or pseudorandom code.

In some embodiments, communication beacon 116, merchant device 114 and/or system 102 (e.g., one or more servers 110) may be configured to determine a location of a consumer based on communication between communication beacon 116 and consumer device 106. For example, consumer device 106 may be determined to be outside of merchant shop 202 and in response, may be sent an outside-of-shop impression indicating one or more outside-of-shop promotions. In another example, consumer device 106 may be determined to be inside of merchant shop 202 and in response, may be sent an in-shop impression indicating one or more in-shop promotions. More generally, various messages, promotions, advertisements, etc. may be provided to a consumer device based on the location of the consumer device as detected via the one or more communication beacons.

FIG. 3 shows a schematic block diagram of an example merchant device 114 in accordance with some embodiments. Merchant device 114 may be configured to perform various functionalities defined by modules 202-224. In some embodiments, each module may comprise circuitry configured to perform the functionality discussed herein. In various embodiments, one or more of modules 202-224 may be included in a merchant device, may be separated into smaller modules, and/or may be combined within a more comprehensive module.

Merchant device 114 may include one or more of in-shop promotion module 302, outside-of-shop promotion module 304, point-of-sale module 305, presence module 308, consumer profile module 310, reports module 312, promotion redemption module 314, payment account module 316, server message module 318, consumer dashboard module 320, online ordering, appointments, deals, and rewards module 322, and ratings and reviews module 324.

In-shop promotion module 302 may be configured to allow a merchant to define in-shop promotions. For example, in-shop promotion module 302 may be configured to generate in-shop promotion data defining an in-shop promotion and to provide the in-shop promotion data to the server. Outside-of-shop promotion module 304 may be configured to allow a merchant to define outside-of-shop promotions. Outside-of-shop promotion module 302 may be configured to generate out-of-shop promotion data defining an out-of-shop promotion and to provide the out-of-shop promotion data to the server. In some embodiments, in-shop promotion module 302 and/or outside-of-shop promotion module 304 may be configured to provide promotion interfaces that allow the merchant to define promotions using templates allow the merchant to define various promotion parameters including one or more of an item, promotional value, accepted value, availability date and/or time, among other things.

Point-of-sale module 306 may be configured to provide point-of-sale functionality such as associating items with a tab or shopping cart, determining total costs for items, tip amounts, processing transactions, printing tickets and/or kitchen displays, among other things.

Presence module 308 may be configured to determine the presence of consumer devices that are within a communicable range of a communication beacon and/or merchant device. For example, merchant device 114 may be configured to communicate with server 110. Additionally or alternatively, merchant device 114 may communicate directly with a communication beacon, such as via a wired or wireless connection. Presence module 308 may be configured to record visitation data related to consumer location and presence. For example, based on wirelessly polling consumer devices with one or more communication beacons, the location and duration of the location of consumer devices may be tracked. Consumer profile module 310 may be configured to provide consumer data to a display of merchant device 114. For example, subsequent and/or in response to a consumer device being detected by presence module 308, consumer profile module 310 may be configured to provide a display of a consumer profile of the consumer. In some embodiments, the consumer profile may include details of the consumer such as name, image, interests, preferences, redeemable promotions, stored payment status, transaction data (e.g., recent purchases), contact information, favorite items (e.g., most purchased), allergies, visitation data, among other things.

In some embodiments, the detection of consumer presence may be indicated on the merchant device to alert the merchant. FIG. 10 shows an example of a presence display 1000 in accordance with some embodiments. Presence display 1000 may include point-of-sale interface 1002, configured to provide point-of-sale functionality. For example, items may be added to tab 1004 based on a merchant selecting an item category button 1006, which may allow the merchant to select items form the menu to add to tab 1004. Presence display 1000 may further include consumer indication 1008. For example, consumer indication 1008 may be a popup, display, indication, window, and/or other alert within presence display 1000 indicating consumer information (e.g., name, image, etc.) and presence of the consumer. Where the consumer name is displayed, for example, the merchant may be able to greet the consumer by name and/or otherwise serve/interact with the consumer in accordance with consumer data displayed on the merchant device 114

Returning to FIG. 3, reports module 312 may be configured to generate reports of the merchant. The reports may be associated with any of the functionality discussed herein. For example, the merchant may be allowed to generate reports directed to sales, taxes, expenses, time keeping, among other things. As such, reports module 312 may be configured to generate reports for various parameters of interest.

Promotion redemption module 314 may be configured to facilitate promotion redemption. For example promotion redemption module 314 may be configured to allow a consumer to redeem an in-shop promotion and/or out-of-shop promotion. In some embodiments, promotion redemption module 314 may receive an instrument, code, key, identifier, barcode, and/or other redemption data from a consumer device that identifies a particular promotion and indicates consumer intent to redeem the promotion. In response, promotion redemption module 314 may be configured to provide the redemption data to server 110 for processing the redemption. If the server approves the redemption (e.g., by comparing the redemption data with redeemable promotions of the consumer), the server may provide an indication that the promotion can be redeemed to promotion redemption module 314. In some embodiments, promotion redemption module 314 may be configured to apply a redeemed promotion to a tab, shopping cart, transaction, etc. For example, the promotional value of the promotion may be deducted from the total cost.

Payment account module 316 may be configured to allow merchant device 114 to take payments by consumers using their consumer device. For example, system 102 may store payment data associated with a payment method (e.g., credit card, debit card, checking account, financial account, payment account, etc.) in association with a consumer account. The payment data, which may be stored with encryption or otherwise, may be subsequently used to provide payments to merchants. For example, payment account module 316 may be configured to send consumer approval data (e.g., from a consumer device or otherwise generated in response to an indication of consumer consent) indicating consumer approval of a payment. The consumer approval data may not include any payment data. Instead, payment account module 316 may be configured to provide the consumer approval data to system 102, which may then facilitate a transaction based on the consumer approval data and the stored payment data. With reference to FIG. 10, in some embodiments, the merchant may create and/or access a tab associated with a consumer via a selection of a consumer indication 1008.

Message module 318 may be configured to generate merchant messages for consumers. The messages may be provided to the server, which may then provide the messages to consumers based on various criteria. The merchant messages may be sent to consumer device via any suitable communication channel, such as email, text, webpage, mobile application alert, etc. In some embodiments, different merchant messages may be associated with different locations of a merchant shop (e.g., outside, inside, at a particular aisle, at an order counter, etc.). Additionally or alternatively, the merchant may be allowed to specify the times that a message is sent, the associated location of the merchant shop (if any, e.g., messages may be sent via network 104 regardless of location of the consumer device), the number of instances of the message, a targeted consumer demographic, characteristic, or segment, among other things.

In some embodiments, message module 318 may be configured to provide preconfigured templates that expedite the merchant creation of messages to various consumer demographics or segments. For example, based on historical visitation data, consumers may be categorized as new consumers (e.g., first visit to the merchant shop), lapsed or returning (e.g., visited before but not since a predefined time, such as 4 weeks), regular (e.g., at least a certain number of visits within a predetermined time—such as at least 2 times in last 3 weeks, most recent visit not longer than a predetermined time, etc.), and/or VIP (e.g., regular consumer, exceeded a particular spending threshold, etc.). Each category of consumers may be associated with a different template. Server message module 318 may allow the merchant to tailor a particular message for each template and consumer demographic or segment represented by each template. For example, a new customer may receive a "welcome" promotion or message, a lapsed customer may receive a "we miss you" promotion or message, a regular consumer may receive a regular reward or message, and a VIP consumer may receive a VIP (e.g., increased) reward or special message. Templates may be associated with various other demographics. For example, a book merchant may utilize separate templates for children and adults to provide age-targeted messaging for upcoming new release books.

Consumer dashboard module 320 may be configured to allow a merchant to interact with consumer data provided by system 102. For example, consumer data associated with each consumer detected by the communication beacon may be provided to a display of merchant device 114 by consumer dashboard module 320. Consumer dashboard module 320 may be configured to generate a listing of detected consumers. Additionally or alternatively, the listing may be categorized or filtered based on location, such as in-shop or outside-of-shop consumers. Based on merchant selection of a consumer, consumer dashboard module 320 may be configured to provide a consumer profile. In some embodiments, a consumer profile may additionally or alternatively be provided to the merchant in response to the merchant selecting a consumer indication 1008 (e.g., as shown in FIG. 10) or the like.

FIG. 11 shows an example of a consumer profile 1100 in accordance with some embodiments. Consumer profile 1100 may include consumer information about a consumer, such as a consumer that has been detected by a communication beacon. Consumer profile 1100 may include basic information 1102 (e.g., name, image, email address, contact information, etc.), visitation status 1104 (e.g., indicating that the consumer is a regular customer), and visitation data 1106. Visitation data 1106, for example, may include spending indicator 1108 (e.g., shown as a rating out of five "$," but may alternatively or additionally be represented in other forms including monetary amounts, average spent, total spent, etc.), a visit count, average spent, total spent, and average tip amount of the consumer.

Consumer profile 1100 may include redeemable promotion indicator 1110 indicating redeemable promotions associated with the consumer or consumer account. Each redeemable promotion may be associated with a redeem button 1112, which may allow the merchant to initiate redemption of the promotion on behalf of the consumer. Consumer profile 1100 may include further include additional consumer information. For example, insights 1114 and notes 1116 may include consumer data that is relevant for facilitating consumer service that is be determined based on tracking consumer purchases and other behavior (e.g., at the merchant shop and/or at other merchant shops) and/or provided by the consumer (e.g., allergy information). Most purchased indication 1118 may include a listing of menu items that are most commonly purchased by the consumer (e.g., at the merchant shop and/or at other merchant shops). In some embodiments, each item within consumer profile 1100 may be associated with an add item button 1120. The merchant may add an item to a tab associated with the consumer and/or consumer account by selecting an add item button 1120 within consumer profile 1100.

In some embodiments, consumer dashboard module 320 may be configured to allow a merchant to interact with historical consumer data. For example, historical consumer data associated with each consumer detected by the communication beacon may be provided to a display of merchant device 114 by consumer dashboard module 320. The historical consumer data may include the same or similar components as the (e.g., live) consumer data discussed above. For example, a listing of each consumer of the historical consumer data may be provided by consumer dashboard module 320. Furthermore, a consumer profile associated with each consumer of the historical consumer data may be accessed and viewed by the merchant.

In some embodiments, the historical consumer data may include aggregated consumer data of a plurality of (e.g., all) consumers. For example, the visitation data discussed above for a single consumer may be aggregated for the plurality of consumers. As such, the merchant may be able to track consumer behavior such as number of visits, average spent, total spent, average tip, walk-bys, number of walk-bys that enter the merchant shop, number of walk-bys that do not enter, etc.

In some embodiments, the consumer data may be further classified based on consumer characteristics or filters. For example, consumer data and/or historical consumer data may be associated with consumer characteristics of the consumer. The characteristics of the consumer may be determined based on profile data and/or other consumer data indicating demographics (e.g., age, gender, interests, group membership, hobbies, purchase history, browsing history, etc.) of the consumer. Consumer dashboard module 320 may be configured to allow the merchant to filter or select demographics and/or other characteristics of interest. In response, a listing of consumers and/or associated consumer data/profiles that match (or best match) the selected characteristics may be provided to the merchant. In some embodiments, consumer data may additionally or alternatively be tracked and filtered based on visitation date, last visit date, number of visits, total spending amounts, alphabetical sort, visitation status (e.g., new, regular, VIP, lapsed), among other things. In some embodiments, consumer dashboard module 320 may be configured to provide search functionality (e.g., text-based) for consumer profile lookup based on the consumer data (e.g., name, demographic, visitation status, visitation date, total spending, etc.).

Returning to FIG. 3, online ordering, appointments, deals, and rewards module 322 may be configured to provide various other merchant-related functionalities. For example, module 322 may allow the merchant to receive order data (e.g., via network 104 and/or the Internet) indicating items to be added to an order or tab. Module 322 may also allow a merchant to schedule appointments with consumers, provide discounts, and rewards (e.g., reward tracking, spending tracking, customer loyalty points, gifts, etc.). The various functionalities of module 322, as well as the other modules discussed herein, may be combined into one or more individual modules.

Ratings and reviews module 324 may be configured to provide the merchant with ratings and reviews of items, service, the merchant facility, and/or other aspects of the merchant and consumer interaction. In some embodiments, ratings and review module 324 may be configured to provide a consumer review interface to the consumer device. For example, in response to determining that a consumer device is no longer detected by a communication beacon, ratings and review module 324 may be configured to determine an item purchased and/or otherwise provided to the consumer. Based on the item or otherwise, module 324 may be configured to provide an applicable review. In some embodiments, ratings and review module 324 may alternatively or additionally be configured to receive review and/or rating data generated by consumers from the server. In that sense, system 102 may be configured to provide merchants with consumer feedback, which may be published to the merchant webpage (or other location) or kept confidential with the merchant.

FIG. 4 shows a schematic block diagram of an example consumer device 108 in accordance with some embodiments. Consumer device 108 may be configured to perform various functionalities defined by modules 402-412. In some embodiments, each module may comprise circuitry configured to perform the functionality discussed herein. In various embodiments, one or more of modules 402-412 may be included in a consumer device, may be separated into smaller modules, and/or may be combined within a more comprehensive module.

Consumer device 108 may include one or more purchase in-store promotion module 402, purchase outside-of-shop 402, profile module 406, ordering and appointment module 408, notification, rewards, ratings, and review module 410, and transaction notification module 412.

Purchase in-shop promotion module 402 may be configured to allow a consumer to purchase an in-shop promotion.

For example, purchase in-shop promotion module 402 may be configured to receive an in-shop impression from the server and provide a display of the in-shop impression to a display of consumer device 108. Via the in-shop impression, the consumer may be allowed to purchase an in-shop promotion. Purchase outside-of-shop promotion module 404 may be configured to allow the consumer to purchase an outside-of-shop promotion. For example, purchase outside-of-shop promotion module 404 may be configured to receive an outside-of-shop impression from the server and provide a display of the outside-of-shop impression to a display of consumer device 108. Similarly, via the outside-of-shop impression or otherwise, the consumer may be allowed to purchase an in-shop promotion. For example, the consumer may be configured to generate and sent promotion purchase data to the server based on consumer input provided by consumer device 108.

Profile module 406 may be configured to allow the consumer to create, view, modify, and/or otherwise manage the consumer profile associated with the consumer. With reference to FIG. 11, for example, the consumer may be allowed to change basic information 1102 such as name, image, contact information, etc. The consumer may also be allowed to change other profile information such as demographic information, interests, allergy information, hobbies, preferences, etc. Furthermore, in some embodiments, the consumer may be allowed to view visitation data for one or more merchants and/or set sharing permissions of the consumer data for merchants.

Ordering and appointment module 408 may be configured to allow consumer device 108 to make online orders or reservations with a merchant. For example, in some embodiments, the server may be configure to facilitate the online ordering, reservations, or appointments based on receiving data from consumer device 108 via network 104. Based on the received data, the server may be configured to generate an online order, reservation, or schedule as suitable and to provide the applicable information to merchant device 114, such as for processing by online ordering, appointments, deals, and rewards module 322 of merchant device 114.

Notification, rewards, ratings, and review module 410 may be configured for a variety of consumer uses, each of which may be separate modules or distributed among one or more modules. Module 410 may be configured to provide notifications or messages to the consumer, some or all of which may be generated by message module 318 of merchant device 114. Module 410 may also provide for awards tracking for consumers. For example, each merchant or reward program in which the consumer is participating or eligible may be provided to the consumer. In some embodiments, module 410 may be further configured to allow the consumer to generate and/or provide review data for review or rating of an item and/or merchant. For example, the review data may be provided to the server. The server may process the review data and may provide consumer reviews to consumers and/or the merchant.

Transaction notification module 412 may be configured to provide notifications to the consumer for successful transactions. A transaction may include the purchase of an item, a purchase of a promotion, and/or redemption of a promotion. In some embodiments, in response to successfully facilitating a transaction, the server may be configured to provide an indication to transaction notification module 412. Transaction notification module 412 may be configured to receive the indication and to provide a display of the indication to the consumer.

FIG. 5 shows a schematic block diagram of example circuitry 500, some or all of which may be included in point-of-sale system 108, merchant device 114, communication beacon 116, system 102, server 110, database 112, and/or consumer device 106. In accordance with some example embodiments, circuitry 500 may include various means, such as one or more processors 502, memories 504, communications modules 506, and/or input/output modules 508.

As referred to herein, "module" includes hardware, software and/or firmware configured to perform one or more particular functions. In this regard, the means of circuitry 500 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 504) that is executable by a suitably configured processing device (e.g., processor 502), or some combination thereof.

Processor 502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments, processor 502 may comprise a plurality of processing means. The plurality of processing means may be embodied on a single computing device or may be distributed across a plurality of computing devices collectively configured to function as circuitry 500. The plurality of processing means may be in operative communication with each other and may be collectively configured to perform one or more functionalities of circuitry 400 as described herein. In an example embodiment, processor 502 may be configured to execute instructions stored in memory 504 or otherwise accessible to processor 502. These instructions, when executed by processor 502, may cause circuitry 500 to perform one or more of the functionalities described herein.

Whether configured by hardware, firmware/software methods, or by a combination thereof, processor 502 may comprise an entity capable of performing operations according to embodiments of the present invention while configured accordingly. Thus, for example, when processor 502 is embodied as an ASIC, FPGA or the like, processor 502 may comprise specifically configured hardware for conducting one or more operations described herein. As another example, when processor 502 may be embodied as an executor of instructions, such as may be stored in memory 504, the instructions may specifically configure processor 502 to perform one or more algorithms, methods or operations described herein. For example, processor 502 may be configured to execute operating system applications, firmware applications, media playback applications, media editing applications, among other things.

Memory 504 may comprise, for example, volatile memory, non-volatile memory, or some combination thereof. Although illustrated in FIG. 5 as a single memory, memory 504 may comprise a plurality of memory components. The plurality of memory components may be embodied on a single computing component or distributed across a plurality of computing components. In various embodiments, memory 504 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 504 may be configured to store information, data, applications, instructions, or the like for enabling circuitry 500 to carry out various functions in accordance with example embodiments discussed herein. For example, in at least some embodiments, memory 504 may be configured to buffer input data for processing by processor 502. Additionally or alternatively, in at least some embodiments, memory 504 may be configured to store program instructions for execution by processor 502 and/or data for processing by processor 502. Memory 504 may store information in the form of static and/or dynamic information. This stored information may be stored and/or used by circuitry 500 during the course of performing its functionalities.

Communications module 506 may be embodied as any component or means embodied in circuitry, hardware, a computer program product comprising computer readable program instructions stored on a computer readable medium (e.g., memory 504) and executed by a processing device (e.g., processor 502), or a combination thereof that is configured to receive and/or transmit data from/to another device, such as, for example, a second circuitry 500 and/or the like. In some embodiments, communications module 506 (like other components discussed herein) can be at least partially embodied as or otherwise controlled by processor 502. In this regard, communications module 506 may be in communication with processor 502, such as via a bus. Communications module 506 may include, for example, an antenna, a transmitter, a receiver, a transceiver, network interface card and/or supporting hardware and/or firmware/software for enabling communications. Communications module 506 may be configured to receive and/or transmit any data that may be stored by memory 504 using any protocol that may be used for communications. Communications module 506 may additionally and/or alternatively be in communication with the memory 504, input/output module 408 and/or any other component of circuitry 500, such as via a bus. Communications module 506 may be configured to use one or more communications protocols such as, for example, Bluetooth, Wi-Fi (e.g., a 802.11 protocol, etc.), radio frequency systems (e.g., 900 MHz, 1.4 GHz, and 5.6 GHz communication systems), infrared, mobile broadband, GSM, GSM plus EDGE, CDMA, quadband, and other cellular protocols, VOIP, and/or any other suitable protocol. In some embodiments, such as when circuitry 500 is embodied as a communication beacon, a root beacon, and/or a consumer device communication beacon, communications module 406 may be configured to generate a wireless PAN for communication with other devices within communicable range of the wireless PAN.

Input/output module 508 may be in communication with processor 502 to receive an indication of an input and/or to provide an audible, visual, mechanical, or other output. In that sense, input/output module 508 may include means for performing analog-to-digital and/or digital-to-analog data conversions. Input/output module 508 may include support, for example, for a display, touchscreen, keyboard, button, click wheel, mouse, joystick, an image capturing device, microphone, speaker, biometric scanner, and/or other input/output mechanisms. In embodiments where circuitry 500 may be implemented as a server or database, aspects of input/output module 508 may be reduced as compared to embodiments where circuitry 500 may be implemented as an end-user machine or other type of device designed for complex user interactions. In some embodiments (like other components discussed herein), input/output module 508 may even be eliminated from circuitry 500. Alternatively, such as in embodiments wherein circuitry 500 is embodied as a server or database, at least some aspects of input/output module 508 may be embodied on an apparatus used by a user that is in communication with circuitry 500. Input/output module 508 may be in communication with memory 504, communications module 506, and/or any other component(s), such as via a bus. Although more than one input/output module and/or other component can be included in circuitry 500, only one is shown in FIG. 5 to avoid overcomplicating the disclosure (e.g., like the other components discussed herein).

In some embodiments, one or more of modules 302-324 or 402-412 may also or instead be included and configured to perform the functionality discussed herein. In some embodiments, some or all of the functionality of modules 302-324 or 402-412 may be performed by processor 402. In this regard, the example processes and algorithms discussed herein can be performed by at least one processor 402. For example, non-transitory computer readable storage media can be configured to store firmware, one or more application programs, and/or other software, which include instructions and other computer-readable program code portions that can be executed to control processors of the components of system 500 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 402, to produce a machine, such that the computer program product includes the instructions which execute on the computer or other programmable data processing apparatus to create a means for implementing the functions specified in the flowchart block or block diagrams.

These computer program instructions may also be stored in a non-transitory computer-readable storage device (e.g., memory 504) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions Communication Beacon Based Promotions FIG. 6 shows an example of a method 600 of associating a communication beacon with a merchant in accordance with some embodiments. For example, a central system (e.g., promotion and marketing system 102) may be configured to provide a promotion and marketing service to one or more merchants. Each merchant may be associated with one or more communication beacons that may be strategically placed at various locations of a merchant shop. When the central system receives consumer presence data from an associated communication beacon indicating that a consumer device is within a direct wireless communicable range of the communication beacon, the central system may then send a suitable message of the merchant based on an association between the merchant and the communication beacon.

Method 600, as well as the other methods discussed herein, is described as being performed by system 100 (e.g., one or more servers 110, communication beacon 116, etc.). However, other suitable devices, apparatuses, machines, etc. may be used. Method 600 may begin at 602 and proceed to 604, where a server may be configured to generate a merchant webpage associated with a merchant. The merchant webpage may be the official webpage of the merchant or may be a different webpage provided by system 110 on behalf of the merchant. The merchant webpage may include information about the merchant such as menu information, item information, location, hours of operation, reviews, ratings, among other things.

In some embodiments, the server may be configured to provide a merchant webpage for multiple merchants based on identifying merchant data. For example, the server may be configured to (e.g., programmatically) identify a merchant and create a merchant webpage based on available merchant information (e.g., received from a merchant device, retrieved from database 112, accessed from the Internet, official merchant webpages, third party webpages (e.g., merchant review webpages, indexes, directories, etc.), and/or any other source). The merchant webpage may include merchant information about the merchant such as the items offered, images (e.g., of the merchant shop and/or items offered), videos, audio, prices, ratings, reviews, among other things.

At 604, the server may be configured to receive merchant provided data from a merchant device. For example, the merchant provided data may include additional merchant information regarding the merchant such as merchant location data indicating a location of the merchant and business hour data indicating business hours of the merchant and/or merchant location. The merchant provided data may further include item data (e.g., indicating products, services, experiences offered, prices, availability, etc.), item image data (e.g., pictures and/or other media demonstrating an item), and/or merchant shop image data (e.g., pictures and/or other media showing the merchant shop).

In some embodiments, the server may be configured to programmatically generate the merchant webpage and publish the merchant webpage (e.g., on the Internet), which may be subsequently "claimed" by the merchant. The merchant may be allowed to at least partially control the content of the merchant webpage once claimed. For example, the merchant webpage may include a merchant interface that allows the merchant to claim the page (e.g., via selection of a claim page button). In response to the selection of the claim page button, the server may be configured to provide a second interface for receiving some or all of the merchant provided data.

At 606, the server may be configured to update the merchant webpage based on the merchant provided data. For example, the merchant webpage may be updated to provide an indication of the location of the merchant, business hours, items offered, image(s) or other media of the items, and image(s) of the merchant shop. The server may be further configured to provide the merchant webpage to consumers, such as via publication on the Internet.

At 608, the server may be configured to associate a communication beacon with the merchant in response to receiving at least a portion of the merchant provided data from the merchant device. For example, the communication beacon may be associated with a beacon identifier that uniquely identifies the communication beacon. The server may be further configured to associate the beacon identifier with the merchant. In some embodiments, the communication may be provided to the merchant and/or located at the merchant shop for consumer device presence detection.

The merchant provided data (e.g., at 604) may indicate intent of the merchant to receive a communication beacon and/or enhanced services provided by system 102. In some embodiments, merchant provided data indicating basic merchant information may be sufficient for claiming the merchant webpage, such as the merchant location data and the business hour data. To receive a communication beacon and/or other enhanced services, however, the server may be configured to request data useful in facilitating the enhanced services such as item data, image data, and/or merchant shop image data.

In some embodiments, the merchant provided data may include structured menu data. For example, the merchant interface may include entries for receiving the structured menu data that may be provided via a user input device of the merchant device. The entries for a menu item for example, may include an entry for the name, description, price, availability, item image data, etc. Based on the structured menu data, system 102 may be configured to programmatically generate a menu and provide the menu to consumer devices via the webpage and/or based on consumer device location as discussed in further detail below.

In some embodiments, system 102 may be configured to utilize the merchant provided data to facilitate providing impressions of promotions to consumers, promotion redemption, point-of-sale related functionality, consumer data collection and processing, and/or among other things. However, the merchant may not be required to offer or agree to offer any promotions to claim the merchant webpage and/or receive the communication beacon. As discussed in further detail below, the communication beacon may be used to collect data regarding consumer behavior and/or allow the system to provide merchant originated messages to consumers at or near the merchant shop of any content. Some embodiments may additionally or alternatively allow the merchant to define an out-of-shop promotion or in-shop promotion that may be provided to consumers based more precise consumer location determination with the communication beacons. Method 600 may then proceed to 610 and end.

FIG. 7 shows an example of a method 700 of communicating with a consumer device with a communication beacon in accordance with some embodiments. For example, a plurality of merchants may each be associated with one or more communication beacons, thereby forming a network or mesh of communication beacon coverage. System 102 may be configured to provide services to each of the merchants based on the consumer presence and/or location detection.

Method 700 may begin at 702 and proceed to 704, where the server may be configured to associate a communication beacon with a merchant. The association may be performed as described above in method 600 and/or using any other suitable technique. The communication beacon may be placed at the merchant shop (e.g., at or near a front window or entrance) for consumer presence detection.

At 706, the communication beacon may be configured to communicate with a consumer device via a direct wireless connection when the consumer device is within a wireless direct communicable range of the communication beacon. In some embodiments, the communication beacon may be configured to broadcast a beacon identifier via a wireless personal area network (PAN). For example, one or more communication beacons may be located at a merchant shop as shown in FIG. 2.

In some embodiments, the communication beacon may be configured to passively emit the beacon identifier. In some embodiments, the communication beacon may be configured to broadcast the beacon identifier using a Bluetooth protocol. For example, protocols such as Bluetooth low energy (LE) may be particularly suitable when the communication beacon is battery-powered. Other example wireless PAN protocols that may alternatively or additionally be used may include IrDA, Wireless USB, Z-Wave, ZigBee, Body Area Network, among other things. Where a merchant shop includes multiple communication beacons, each of the communication beacons may be configured to broadcast a different beacon identifier that uniquely identifies the beacon. In some embodiments, the beacon identifier may be changed, updated, or otherwise configured by the merchant device.

In some embodiments, a point-of-sale system at a merchant shop may include multiple communications beacons that are each located at different locations of interest and/or each configured to broadcast different beacon identifiers. Here, the communication beacons may form a mesh of signal coverage within the locations of interest.

At 708, the server may be configured to receive consumer presence data from the communication beacon indicating that a consumer device and the communication beacon has formed the direct wireless connection. For example and with reference to FIG. 2, a consumer may be carrying the consumer device 106 (e.g., a mobile device such as a smartphone) may enter wireless direct communicable range of the communication beacon consumer device 106 and/or wireless PAN 208, such as by the consumer walking by or entering the merchant shop. In some embodiments, the connection may be formed without the consumer device and/or the merchant device having active Internet access at the time of the connection (e.g., an active connection to the one or more public servers). For example, the connection may be a wireless connection over a personal area network (e.g., via connection 110 shown in FIG. 1).

In some embodiments, the consumer device may be configured to provide a consumer application. The consumer application may be configured to determine whether wireless communications of the applicable protocol has been enabled. For example, where Bluetooth is used, the application may include a Bluetooth syncing library that detects whether Bluetooth capability is enabled. If the protocol is enabled, the consumer device may begin announcing a presence detection service to other devices, such as the communication beacon. For example, a process and/or application may execute on and configure the consumer device to broadcast (e.g., via Bluetooth) one or more suitable messages. In some embodiments, the consumer device may be configured to provide a user interface that allows the consumer to enable or disable the announcing of the presence detection service. In some embodiments, the presence detection service may include one or more background processes that may run while the consumer device is locked, in a low-power mode, and/or executing other applications in the foreground.

The communication beacon may begin discovering the presence detection service. For example, a process and/or application may execute on the merchant device that configures the merchant device to discover other devices, such as the consumer device, that are currently announcing the transaction session service.

In some embodiments, the consumer device may be configured to discover the presence detection service while the communication beacon may be configured to announce the presence detection service. Additionally and/or alternatively, both devices may be configured to be capable of announcing and discovering the presence detection service. For example, both devices may discover compatible devices and/or be discovered by compatible devices.

Next, a connection between the communication beacon and the consumer device may be created. The connection may be a direct wireless connection (e.g., including no intervening devices, switches, routers, networks, etc.), such as a personal area network (PAN) connection. In some embodiments, the discovery range may be set by the merchant and/or the consumer device and/or by the range at which the devices can be located from each other and still be able to communicate (such as when Bluetooth and/or other direct connect wireless technology is used). In some embodiments, one or more communication beacons may be used for presence detection of one or more consumer device. Additional details regarding consumer device beacons, applicable in some embodiments, are discussed in U.S. Provisional Patent Application No. 61/883,846, titled "Systems and Methods For Programmatically Grouping Consumers," filed Sep. 27, 2013, which is incorporated by reference herein in its entirety and for all purposes.

In response to detecting the presence of a consumer device, the communication beacon may be configured to generate and/or otherwise provide consumer data indicating that the consumer device and the communication beacon has formed the direct wireless connection to the server. The server may be configured to receive the consumer presence data from the communication beacon, such as via network 104.

In some embodiments, the consumer presence data transmitted between the communication beacon and the server may include data that identifies the consumer and/or the merchant. For example, the consumer presence data may include consumer identifying data. For example, the consumer identifying data may include a consumer account name or identifier, a consumer name, user name, etc.

In some embodiments, the consumer presence data may include secured data configured to prevent the consumer information, payment information, and/or other sensitive information from being taken by unauthorized wireless devices. For example, the communication beacon may be configured to receive wallet identifying data from the consumer device via the direct wireless connection. The wallet identifying data may be generated by the system and may be based on a random or pseudorandom code, key, token, or the like, that is meaningless to unauthorized devices. The server may be configured to provide the wallet identifying data to the consumer device for the purposes of consumer device and/or consumer identification with communication beacons. Based on receiving the wallet identifying data from the communication beacon, the server may be configured to identify a consumer and/or consumer account based on the wallet identifying data. The server may be further configured to determine consumer data associated with the consumer, which may include consumer identifying data. The server may be further configured to provide some or all of the consumer data to a merchant device, such as merchant device 114 that is associated with the same merchant and/or merchant shop as communication beacon 116. In that sense, the consumer identifying and/or other sensitive information is not passed through the direct wireless connection.

When a beacon identifier is used to identify a merchant, the server may be configured to receive an indication that a consumer device received and/or otherwise detected the beacon identifier from the communication beacon. In some embodiments, the a device may be located within the same merchant shop as the communication beacon, as shown in FIG. 2 for merchant device 202. The consumer device may be configured to receive the beacon identifier being broadcast by the communication beacon when within a direct wireless communicable range of the communication beacon. In some embodiments, consumer device may be configured to use a compatible communication protocol as the communication beacon, such as the Bluetooth version 4.0 with low energy (LE) technology. In some embodiments, the consumer device may be configured to (e.g., via executing an application in the background of an operating system) detect the presence of the nearby communication beacon. Here, the consumer device may be configured to utilize the Bluetooth LE protocol, among other things, to achieve low power communication beacon discovery.

In some embodiments, the consumer device may be further configured to provide the consumer presence data to the system, such as via another device(s) and/or network(s) (e.g., the communication beacon and the wireless PAN of the communication beacon, network 104, the Internet, among other things). As such, server may be alternatively or additionally configured to receive the consumer presence data from the consumer device.

At 710, the server may be configured to determine merchant information associated with the merchant. The merchant information may include any of the information associated with the merchant discussed herein, including promotion-related and/or merchant provided data. The server may be configured to identify the merchant based on the consumer presence data being received from a particular communication beacon. The consumer presence data and/or other data transmitted between the communication beacon and the server may include merchant identifying data that identifies the merchant and/or the beacon identifier (e.g., which may be associated with the merchant and/or merchant identifier by the system). Additionally or alternatively, the consumer presence data may include the beacon identifier, which may be used by the server to identify the merchant. The server may be configured to determine the merchant information based on the merchant identifying data. For example, the server may be configured to query a database (e.g., database 112) including merchant information associated with a plurality of merchants based on the merchant identifying. Each of the plurality of merchants and/or their merchant information may be associated with different merchant identifying, which may be received by the server in response to the query.

At 712, the server may be configured to provide the merchant information to the consumer device. In some embodiments, at least a portion of the merchant provided data may be provided to the consumer device as the merchant information. The merchant information may be provided in response to receiving the consumer presence data indicating that the consumer device and the communication beacon has formed the direct wireless connection. In some embodiments, the server may be configured to communicate with the consumer device via network 104. Alternatively or additionally, the server may communicate with the consumer device via a communication beacon. For example, the communication beacon may communicate wirelessly with the consumer device via connection 18 and the server and communication beacon may communicate via network 104 and/or merchant device 104.

In some embodiments, different merchant information may be provided to the consumer device based on location of the consumer device as determined via the communication beacons. As discussed in greater detail below with respect to method 800 and FIG. 8 and method 900 and FIG. 9, the server may be configured to determine that the consumer device is near but outside of the merchant shop and in response, provide an out-of-shop impression indicating one or more out-of-shop promotions to the consumer device. In another example, the server may be configured to determine that the consumer device has entered the merchant shop and in response, may be configured to provide an in-shop impression indicating one or more in-shop promotions to the consumer device. Furthermore, in some embodiments, other enhanced features for facilitating consumer and merchant interactions may be provided when the consumer device is determined to be inside the merchant shop. For example, seating, reservation, menu display and/or menu ordering interfaces may be provided to the consumer when the merchant is a dine-in restaurant.

In general, various messages may be defined for different locations at or near a merchant shop and may be provided to a consumer device based on the consumer device being determined as being at an associated location. In some embodiments, the messages may include in-shop and/or out-of-shop promotions that are configured to be provided to consumers while the consumers are at or near the merchant shop. These promotions may provide incentives for consumers to visit a merchant. Furthermore, consumers may be motivated to activate and/or enable the presence detection service on their consumer devices to receive the in-shop and/or outside-of-shop promotions. As such, the system is able to collect consumer data (e.g., visitation data) for merchants while also driving consumer demand.

At 714, the server may be configured to determine consumer data associated with the consumer. The consumer data may include consumer information such as consumer account and/or profile information. In some embodiments, a consumer may be associated (e.g., subsequent to a registration) with a consumer account. The consumer account may be further associated with the consumer data. For example, the consumer data may include profile information, consumer name, consumer image, interests, preferences, redeemable promotions, stored payment status, transaction data (e.g., recent purchases), contact information, favorite items (e.g., most purchased), allergies, among other things.

In some embodiments, the consumer data may include data tracked based on consumer presence data received from one or more communication beacons over time. For example, the consumer data may include visitation data (e.g., first visit date, number of visits, average spent, total spent, average tip amount, visit frequency, visit time, etc.), visitation status (e.g., new, regular returning, VIP, etc.). The visit time may define a length of time that the consumer device is detected (e.g., via polling with the communication beacon) as being in the merchant shop (e.g., a running total for a current visit and/or a historical average). The visit frequency may define a frequency of consumer visits to a merchant shop associated with the merchant (e.g., per week, month, year, etc.). The visitation data may further define a number of consumer walk-bys and/or a number of consumer walk-bys without entering the merchant shop.

In some embodiments, the server may be configured to generate the consumer data based on tracking interactions between consumers and multiple merchants. For example, the visitation data may be determined based on the consumer presence data indicating the presence and/or location of the consumer devices (e.g., over time) at multiple merchants each associated with a different communication beacon and/or point-of-sale system 108. The server may be configured to share, aggregate, and/or otherwise generate the visitation data of the consumer from the multiple communication beacons.

At 716, the server may be configured to provide the consumer data associated with the consumer to the merchant device. For example, server 110 may be configured to provide the consumer data via network 104 to merchant device 114. As discussed above, in some embodiments, the consumer data may include a consumer profile, such as consumer profile 1100 shown in FIG. 11. In that sense, method 700 may be performed to provide programmatic or (at least partially) automated look up of consumer profiles without requiring that a merchant provide a name or other search criteria. Virtually any of the consumer data discussed herein may be provided to the merchant device including data that identifies the consumer and/or data that facilitates consumer service. In some embodiments, the consumer data may include a consumer profile including visitation data generated by communication beacons, such as consumer profile 1100 shown in FIG. 11. Method 700 may then proceed to 718 and end.

FIG. 8 shows an example of a method 800 of providing an outside-of-shop promotion to a consumer in accordance with some embodiments. Method 800 may be performed to provide messages to consumers that are walking by, outside of, or otherwise near but have not entered the merchant shop. For example, the merchant shop may be located in a commercial area, shopping mall, etc. with several merchants, even some merchants that may be offering competing or substitute items. The messages may include advertising or other promotional content that may be designed to entice a consumer to enter the merchant shop, purchase an out-of-shop promotion, browse or purchase items, etc. In some embodiments, the merchant may be allowed to define out-of-shop promotions that may be offered to consumer (e.g., on a schedule or real-time basis) that are near (e.g., within the communicable range of a wireless direct connection to the communication) and outside of the merchant shop.

Method 800 may begin at 802 and proceed to 804, where the server may be configured to receive outside-of-shop promotion data defining an outside-of-shop promotion from a merchant device associated with a merchant. For example, subsequent to the communication beacon being provided to and/or otherwise associated with the merchant, the server may be configured to provide a promotion interface to the merchant device associated with the merchant for providing the outside-of-shop promotion data. Additionally or alternatively, the merchant device may include outside-of-shop promotion module 304 configured to provide the promotion interface and/or otherwise generate the outside-of-shop promotion data.

The outside-of-shop promotion data may define and/or include promotion parameters of the outside-of-shop promotion. As discussed above, example promotion parameters may include an accepted value (e.g., a cost to purchase the promotion), a promotional value (e.g., the value of the resultant instrument beyond the accepted value), and/or the associated item or items of the promotion. The promotion parameters may define and/or include a promotion availability value indicating a number of instances of the promotion that is available to consumers, a promotion availability time (e.g., when an impression indicating the promotion should be provided to consumer devices), and/or a redemption time (e.g., start time, end time, etc. of promotion redemption). The promotion parameters may additionally or alternatively define triggers or criteria for providing the outside-of-shop promotion. For example, the promotion parameter may define whether the promotion is an outside-of-shop promotion or an in-shop promotion. In another example, the promotion parameter may define a particular location and/or communication beacon at which consumer device presence is detected for receiving an impression of the promotion.

In some embodiments, the promotion interface may include one or more templates. For example, a template may include a field or form for receiving each portion of the promotion parameters and in the compatible format. In some embodiments, the server may be configured to programmatically determine promotion parameters or recommended promotion parameters (e.g., a predefined accepted value, promotional value, and/or discount between the accepted and promotional value). Here, the promotion interface may allow the merchant to change a predetermined or recommended promotion parameter.

In some embodiments, a template may be defined for each promotion type that is associated with a different predefined location and may include different requirements or fields of promotion parameters. For example, outside-of-shop promotions may be defined with an outside-of-shop template that facilitates merchant entry of the outside-of-shop promotion data. In another example, in-shop promotions may be defined with an in-shop template that facilitates merchant entry of the in-shop promotion data.

At 806, the server may be configured to generate the outside-of-shop promotion based on the outside-of-shop promotion data. The server may be configured to generate the outside-of-shop promotion by associating the outside-of-shop promotion data received from the merchant device. In some embodiments, the server may be further configured to store the outside-of-shop promotion for subsequent use, such as within a promotion database (e.g., database 112).

At 808, the server may be configured to generate an outside-of-shop impression indicating the outside-of-shop promotion. An outside-of-shop impression, as used herein, refers to an impression that may be provided to a consumer device while the consumer device is within the communicable range of the communication beacon without being inside of and/or having recently entered the merchant shop. The outside-of-shop impression may be provided to the consumer device via network 104 using any suitable communication channel such as email, text message, consumer device application alert, webpage, merchant webpage, among other things. The outside-of-shop impression may include an indication of the outside-of-shop promotion including various promotion parameters (e.g., item, accepted value, promotional value, etc.) and/or a consumer interface for viewing, purchasing, and/or otherwise accepting the outside-of-shop promotion.

In some embodiments, the outside-of-shop impression may be generated and/or provided to the consumer device based on the outside-of-shop promotion data received from the merchant device (e.g., at 804). For example, the outside-of-shop promotion data may indicate a merchant intent to push the outside-of-shop promotion to consumers as soon as possible (e.g., during a downtime for the merchant). The server may be configured to generate and/or provide the outside-of-shop impression in response to receiving the outside-of-shop promotion data. In another example, the outside-of-shop promotion data may define one or more scheduled times to generate and/or provide the outside-of-shop impression. The server may be configured to generate and/or provide the outside-of-shop impression at a scheduled time. In yet another example, the server may be configured to additionally or alternatively generate and/or provide the outside-of-shop impression for a particular consumer based on matching the one or more promotion parameters to consumer data (e.g., interests, preferences, browsing history, purchase history, promotion purchase and/or browsing history, etc.).

At 810, the server may be configured to determine, based at least in part on consumer presence data, that the consumer device is within the communicable range of the communication beacon without being inside of the merchant shop of the merchant. With reference to FIG. 2, for example, communication beacon 116 may be located at or near a window or entrance of merchant shop 202. Upon consumer device 106 entering communicable range of wireless PAN 208, server may receive consumer presence data from communication beacon 116 as discussed above.

In some embodiments, the communication beacon and/or server may be configured to determine that the consumer device is outside of and/or has not entered the merchant shop. Various suitable techniques for location determination may be used. For example, in some embodiments, multiple communication beacons may be located at a merchant shop as shown by communication beacons 116, 204 and 206 in FIG. 2. The server may be configured to determine consumer device location based on consumer presence data received from the multiple communication beacons. Each communication beacon may be configured to communicate with consumer device 106 as discussed herein. Based on the strength of the wireless signals between consumer device 106 and the communication beacons, the location of the consumer device (e.g., being outside, inside, or at a particular region of the merchant) may be determined such as based on a triangulation.

Additionally or alternatively, one or more communication beacons and/or the server may be configured to determine that the consumer device that the consumer device has entered the merchant shop (or not) based on timing of the direct wireless connection between the communication beacon and the consumer device. For example, a communication beacon may poll the consumer device for presence at predetermined times. An entry threshold time (e.g., 1, 2, 5, 10, etc. minutes) may be defined in which the consumer device may be considered to have entered the merchant shop if the direct wireless connection between the consumer device and communication beacon is maintained within the entry threshold time. Here, consumer devices that are merely passing by the merchant shop may be separated from those that enter the merchant shop for the entry threshold time. Conversely, consumers and/or consumer devices that are detected for a duration that fails to exceed the entry threshold time may be determined as outside of and/or having not entered the merchant shop.

In another example, the server communication beacon and/or server may be additionally or alternatively configured to determine that the consumer device that the consumer device has entered the merchant shop (or not) based on characteristic signal differences of the merchant shop. For example, communication beacon 116 that is placed at or on the interior side of a merchant shop wall, window, door, or the like, may receive a weaker signal for communication beacons outside of the merchant shop, followed by a stronger signal when the consumer device enters the merchant shop. In various embodiments, one or more of the location determination techniques with communication beacons may be used (e.g., as is suitable for a particular merchant shop design or layout).

At 812, the server may be configured to provide the outside-of-shop impression of the outside-of-shop promotion to the consumer device. The outside-of-shop impression may be provided by server 110 to consumer device 106 via network 104. In another example, consumer device 106 may communicate with server 110 via point-of-sale system 108 (e.g., via communication beacon 116 and/or merchant device 104), which may be advantageous for merchant shops with poor mobile broadband connectivity (e.g., for communications between server 110 and consumer device 106 via network 104).

In some embodiments, the server may be configured to provide the outside-of-shop impression to the consumer device based on various conditions. For example, the server may be configured to, prior to providing the outside-of-shop impression, determine that the outside-of-shop impression and/or outside-of-shop promotion has not been provided to the consumer within a predetermined time. The predetermined time may be set to a day, week, month, etc. and may define the frequency at which an outside-of-shop promotion can be provided to the consumer device (e.g., regardless of the number of times the consumer walks by the merchant shop within the predetermined time). In another example, the outside-of-shop impression and/or outside-of-shop promotion may not be sent to the consumer device within a predetermined time subsequent to an item purchase, a predetermined time subsequent to detecting consumer presence as being inside the merchant shop (and/or providing an in-shop impression), and/or a predetermined time subsequent to purchase of an outside-of-shop and/or in-shop promotion, among other things.

Similar to the outside-of-shop impression being provided to the consumer device when the consumer device is detected as being outside of the merchant shop, other data or messages generated by the merchant may be provided to the consumer device based on location. For example, at a retail shop, a promotion, discount, and/or information associated with a particular item or category of item may be provided to the consumer device based on the consumer device being detected as being at an aisle, display, or kiosk associated with the item or category of item. Method 800 may then proceed to 814 and end.

FIG. 9 shows an example of a method 900 of facilitating in-shop consumer and merchant interactions in accordance with some embodiments. Method 900 may be performed to provide messages to consumers that have entered the merchant shop and/or to assist in the commercial interaction between the consumer and merchant.

Method 900 may begin at 902 and proceed to 904, where the server may be configured to receive in-shop promotion data defining an in-shop promotion from a merchant device associated with a merchant. An in-shop promotion, as used herein, refers to a promotion that may be offered to a consumer when the consumer is determined to be inside of the merchant shop based on consumer device presence detection with one or more communication beacons. The server may be configured to provide a promotion interface to the merchant device for merchant entry of the in-shop promotion data. Additionally or alternatively, the merchant device may include in-shop promotion module 302 configured to provide the promotion interface and/or otherwise generate the in-shop promotion data.

The in-shop promotion data may define and/or include promotion parameters of the in-shop promotion, such as an accepted value, a promotional value, one or more associated items, a promotion availability value, a promotion availability time, a redemption time, one or more triggers or criteria for providing the in-shop promotion, and/or among other things. In some embodiments, the discount value (e.g., defined as an absolute or percentage difference between the promotional value and the accepted value) may be defined as being higher for outside-of-shop promotions than in-shop promotions. Here, consumers that would otherwise not enter the merchant shop may be enticed with a larger discount. In another example, an in-shop promotion may be defined by a different item than the outside-of-shop promotion. For example, outside-of-shop promotions may be associated with higher demand items to further entice consumers to enter the merchant shop.

At 906, the server may be configured to generate the in-shop promotion based on the in-shop promotion data. At 908, the server may be configured to generate an in-shop impression indicating the in-shop promotion. An in-shop impression, as used herein, refers to an impression that may be provided to a consumer device while the consumer device is within the communicable range of the communication beacon and inside of the merchant shop. At least some of the discussion at 806-808 of method 800 regarding outside-of-shop impressions and outside-of-shop promotions may be applicable at 906 and 908.

At 910, the server may be configured to determine, based at least in part on consumer presence data, that the consumer device is within the communicable range of the communication beacon and inside of the merchant shop of the merchant. The discussion regarding consumer device location determination at 810 of method 800 may be applicable at 910.

At 912, the server may be configured to provide the in-shop impression of the in-shop promotion to the consumer device. The in-shop impression may be provided by server 110 to consumer device 106 via network 104. In another example, consumer device 106 may communicate with server 110 via point-of-sale system 108 (e.g., via communication beacon 116 and/or merchant device 104). The discussion at 812 of method 800 may be applicable at 912.

At 914, the server may be configured to facilitate point-of-sale functionality. In alternative or addition to providing an in-shop impression in response to determining that the consumer device has entered the merchant shop, the server may be configured to provide the merchant webpage and/or at least a portion of the merchant information discussed above in connection with method 600 to the consumer device to facilitate consumer and merchant interactions. In some embodiments, in response to determining that the consumer device has entered the merchant shop, the consumer device (e.g., via a mobile application) may be configured to display message from the merchant. For example, the message may include a greeting from a "virtual hostess."

In some embodiments, based on merchant provided data including structured menu data, the server may be configured to provide and/or generate a menu and provide the menu to the consumer device in response to determining that the consumer device has entered the merchant shop. Each menu item of the menu may include an indication of a rating value for the item determined based on consumer reviews from previous consumers. In some embodiments, the menu may be provided as part of a user interface that allows the consumer to generate order data indicating selected items for purchase. The consumer device may be configured to provide the order data to the merchant device and/or server to complete a transaction for the selected items. In some embodiments, facilitating point-of-sale functionality may include generating a tab (or shopping cart), associating items with the tab, payments (e.g. via the consumer device or otherwise), tipping, reservations, online ordering, seating, among other things.

In some embodiments, facilitating point-of-sale functionality may include processing or facilitating the processing of a payment. The payment may be provided via any suitable method including cash, cash, check, credit card, debit card, etc. In some embodiments, payment may be provided using stored payment data of the consumer. In that sense, when a consumer is detected and identified as discussed herein, the consumer may be allowed to perform a "seamless payment" (e.g., without requiring the consumer to provide a form of payment to the merchant).

In some embodiments, the server may be configured to facilitate the purchase of an out-of-shop promotion and/or an in-shop promotion. For example, the out-of-shop impression and/or in-shop impression may include user interfaces configured to respectively allow the consumer to purchase the out-of-shop promotion and/or an in-shop promotion via the consumer device. In some embodiments, a purchased out-of-shop promotion and/or an in-shop promotion may be associated with a consumer account of the consumer for subsequent redemption. Furthermore, the server may be configured to provide the consumer device with an instrument for redemption of the purchased out-of-shop promotion and/or in-shop promotion. The instrument include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences.

In some embodiments, facilitating point-of-sale functionality may include redeeming one or more promotions. A promotion may be redeemed in connection with a purchase or separately. The one or more promotions may include in-shop, outside-of-shop, and/or other promotion (e.g., provided to consumer device without communication beacon detection, such as via network 104). In some embodiments, a listing of redeemable promotions may be provided to the merchant device. With reference to consumer profile 1100 shown in FIG. 11, for example, redeem button 1112 may be provided with redeemable promotion indicator 1110 to provide for "seamless promotion redemption" (e.g., without requiring the consumer to provide an instrument or the like). Alternatively or additionally, the redemption may be performed via an instrument. The instrument may include a barcode, identifier, or the like, that may be provided to the merchant via the consumer device, and then to the server to process the redemption. In another example, the consumer device may provide an instruction or redemption instruction to the server and/or merchant device, which may alert the server that the promotion is being redeemed.

At 916, the communication beacon may be configured to wirelessly poll the consumer device to determine whether the direct wireless connection has ended. For example and with reference to FIG. 200, one or more communication beacons 116, 204, 206, etc. may be configured to wirelessly poll consumer device 106 to determine whether consumer device 106 is at or near merchant shop 202. When consumer device 106 leaves communicable range of wireless PAN 208 (e.g., when consumer carrying consumer device 106 leaves merchant shop 202), communication beacon 116 may be configured to provide an indication to the server and/or merchant device 114.

At 918, the server may be configured to provide a consumer review interface to the consumer device subsequent to determining that the direct wireless connection has ended. For example, the server may receive the indication that the wireless direct connection has ended from the communication beacon and/or consumer device. This may indicate that the consumer and merchant interaction has been completed. In response, server may be configured to provide a consumer review interface to the consumer device.

The consumer review interface may be tailored to a particular merchant. For a restaurant merchant, for example, the consumer review interface may allow the consumer to provide a rating and/or review for one or more items and/or the restaurant experience in general. In some embodiments, the server may be configured to determine the item ordered by the consumer and to provide an applicable review or survey to the consumer device. The consumer device may be configured to generate review data based on consumer entry via the consumer review interface.

In some embodiments, the server may be configured to receive the review data from the consumer device provided via the consumer review interface. Where the review data is associated with an item, the server may be further configured to generate a rating value for the item based at least in part on the review data. In some embodiments, review data from a plurality of consumers may be processed to generate a (e.g., aggregated and/or average) rating value. In some embodiments, the server may be configured to generate merchant information based on the review data and/or rating value. The server may be further configured to provide the merchant information to consumer devices including the rating value. For example, the merchant information may be provided to the merchant webpage, menus, impressions, among other things. Method 900 may then proceed to 920 and end.

FIG. 12 shows an example of a method 1200 of redeeming a promotion in accordance with some embodiments. Method 1200 may be performed to provide seamless redemption of one or more redeemable promotions of a merchant by a consumer.

Method 1200 may begin at 1202 and proceed to 1204, where a server (e.g., server 110 of system 102 shown in FIG. 1) may be configured to receive consumer presence data from a communication beacon indicating that the consumer device and the communication beacon has formed a direct wireless connection. The discussion at 708 of method 700 may be applicable at 1202. In some embodiments, method 1200 may be performed in addition or alternative to method 700, as well as one or more of the other methods discussed herein. As discussed above, the consumer presence data may indicate that the consumer carrying the consumer device is at, near, outside, and/or inside the merchant shop. Alternatively or additionally, in some embodiments, the location of the consumer may be determined based on receiving consumer location data or presence data from the consumer device. For example, any suitable technique may be used including one or more of cell tower triangulation, internet protocol (IP) address geolocation, global positioning systems (GPS), among other things. Here, the server may be configured to determine the location of the consumer device and compare the location with known locations of one or more communication beacons, merchant devices, and/or merchant shop locations. In that sense, the server may be configured to determine the consumer and associated consumer device as being at or near a particular merchant.

At 1206, the server may be configured to determine a redeemable promotion of the consumer associated with the consumer device. In some embodiments, the determination may be performed in response to receiving the consumer presence data at 1204. The redeemable promotion may be an in-shop promotion, an out-of-shop promotion, and/or a promotion provided to the consumer device via any type of impression. For example, impressions indicating one or more promotions may be provided to the consumer device on a scheduled basis, in response to receiving a request from the consumer device, based on instructions from a merchant device, among other things.

As discussed above at 714 of method 700, for example, the server may be configured to determine consumer data including redeemable promotions of the consumer and such consumer data may be associated with a consumer account. In some embodiments, the consumer may be allowed to provide login data and/or other consumer account identification (e.g., username) and/or authentication data (e.g., password, one or more biometric identifiers, etc.) for accessing the consumer account via a consumer device. The server may then be configured to, in response to receiving the login data from the consumer device, associate the consumer account with the consumer device and determine the consumer data associated with the consumer account.

At 1208, the server may be configured to provide an indication of the redeemable promotion to the consumer device. The indication may include a display of one or more redeemable promotions that the consumer may redeem at the merchant. As such, in response to receiving the consumer presence data, such as when the consumer is outside of the merchant shop, and/or inside of the merchant shop, the consumer may receive a notification of the redeemable promotion which will remind the consumer of the redeemable promotion and further incentivize the consumer to enter the merchant shop. For example, as the consumer is carrying the consumer device through a commercial area with a plurality of merchant shops that may each include one or more communication beacons, the server may receive consumer presence data indicating that the consumer is at or near a particular merchant. In response, the server may send the consumer notifications of redeemable promotions associated with one or more of the merchants as the server determines that the consumer device is in respective proximity to each merchant. Because the consumer is able to receive location-based redeemable promotion notifications, the consumer may be more incentivized to purchase or otherwise accept promotional offers having the benefit of knowing that the consumer will be less likely to miss a convenient redemption opportunity or miss redeeming the redeemable promotion altogether (e.g., when a redeemable promotion includes an expiration date).

FIG. 13 shows an example of a redeemable promotion display 1300 in accordance with some embodiments. Redeemable promotion display 1300 may be an example of the indication of a redeemable promotion that may be provided to the consumer device from the server. In some embodiments, providing the indication of the redeemable promotion may include providing redeemable promotion data to the consumer device that indicates the redeemable promotion. The consumer device may then be configured to generate redeemable promotion display 1300 and to provide display 1300 to a display of the consumer device. Redeemable promotion display 1300 may include merchant indicator 1302, redemption instruction 1304, and notification acknowledgement button 1306.

Merchant indicator 1302 may include an indication of the merchant to which the consumer device has been determined to be within proximity as discussed herein. Redemption instruction 1304 may provide an instruction to the consumer regarding how to perform the redemption. Here, redemption instruction 1304 indicates to the consumer that the consumer may redeem a redeemable promotion at the merchant by saying the consumer's name, such as to a merchant representative (e.g., an employee, wait staff, cashier, etc.). Conventional electronic voucher redemption techniques typically require that a consumer present a voucher, coupon, or other instrument to the merchant representative. For example, the consumer has been required to hand over their consumer device so that the merchant representative can mark a redeemable promotion or instrument as redeemed. As discussed in greater detail below, however, the consumer may be allowed to seamlessly redeem one or more promotions without presenting any instrument (e.g., electronic or otherwise). In some embodiments, redemption of the redeemable promotion may be performed without requiring any redemption instruction form the consumer device and/or any consumer action interaction with the consumer device. Rather, consumers may be allowed to walk into a merchant shop and without simply say their names to redeem the promotion and/or provide payment for a transaction. Notification acknowledgement button 1306 may be selected by the consumer to close redeemable promotion display 1300, which may return the consumer to a consumer interface and/or to another application of the consumer device, such as a mobile operating system home display where the consumer device is a mobile device. In some embodiments, redeemable promotion display 1300 may be configured to automatically close after a predetermined time (e.g., 5 minutes) after it is displayed and/or provided to the consumer device.

In some embodiments, the indication of the redeemable promotion may be provided to the consumer device via any suitable communication channel. For example, the indication may be an application alert of a consumer application configured to provide the consumer interface as shown by redeemable promotion display 1300. In some embodiments, the application alert may be provided based on the consumer device having the consumer application executing on the consumer device, such as in the background and/or foreground of the consumer device operating system. As the server is capable of pushing notifications of the redeemable promotion, the consumer is not required to access information regarding redeemable promotions through browsing, searching, or otherwise interacting with the consumer interface. In some embodiments, such as when the consumer application is executing in the background, the consumer device may be configured to open and/or otherwise bring the consumer application to the foreground of the consumer device for consumer interaction with the consumer interface. Alternatively or additionally, the server may be configured to provide the indication of the redeemable promotion via a text message, an email, electronic social network feed, among other things. In some embodiments, the indication of the redeemable promotion may alternatively or additionally include a non-graphical signal, such as an auditory notification and/or a tactile notification (e.g., vibration of the consumer device).

In some embodiments, where a consumer or consumer account is associated with multiple redeemable promotions, the server may be configured to provide a promotion selection display in alternative or addition to promotion display 1300. The promotion selection display may allow the consumer to select one or more particular promotions of the multiple redeemable promotions for redemption. In that sense, the server may be configured to determine whether the consumer is associated with more than one promotion and provide an interface for promotion selection to the consumer device. Where the consumer or consumer account is associated with only a single redeemable promotion of the merchant, the server may determine that only the single redeemable promotion is available. Here, no additional consumer input may be required for performing the seamless redemption.

At 1210, the server may be configured to provide a merchant interface including an indication of consumer identifying data to a merchant device associated with the merchant. In some embodiments, the merchant interface may include an indication of consumer identifying data associated with one or more (e.g., each) consumers with consumer devices having direct wireless connections with the communication beacon. The indication of consumer identifying data may be a presence display, such as presence display 1000 including consumer indication 1008 as shown in FIG. 10. Alternatively or additionally, the indication of consumer identifying data may be a consumer profile, such as consumer profile 1100 shown in FIG. 11.

In some embodiments, the server may be configured to provide an indication of consumer identifying data associated with a plurality of consumers. For example, the consumer identifying data may be associated with a plurality of consumers with consumer devices having direct wireless connections with the communication beacon. FIG. 14 shows an example of consumer display 1400 in accordance with some embodiments. Consumer display 1400 may be provided to (e.g., by the server) or otherwise presented on the merchant device and/or merchant interface and may include a listing, graphical display, and/or other indicator of consumers having a consumer device that is at or near the merchant, such as consumer indications 1402-1410. Where a consumer has a redeemable promotion at the merchant, the consumer indication may include a redeem button 1412 which may be selected by the merchant to initiate redemption of the redeemable promotion. In some embodiments, the indication of consumer identifying data associated with the consumer may further include a consumer image. Here, the merchant is able to further verify the identity of the consumer based on comparing the consumer image with the appearance of the consumer.

In some embodiments, consumer display 1400 and/or the merchant interface may include an ordered listing or display of consumers based on proximity to the merchant device. The communication beacon may be the merchant device or be a component of the merchant device. For example, based on received signal strength between consumer devices and one or more communications beacons, the server and/or merchant device may be configured to determine a proximity value indicating a distance that each consumer device is away from the merchant device. As such, consumers that are closer to the merchant may have their consumer information and/or redeemable promotions more prominently displayed or accessible to facilitate consumer and merchant interactions. In some embodiments, the listing may be refreshed at predetermined times (e.g., every 20 seconds) to avoid excessive switching of the consumer orders within the display. In some embodiments, the merchant interface and/or consumer display 1400 may include a consumer proximity refresh button that allows the merchant to trigger polling for consumer devices locations. Here, the ordered listing of consumers based on consumer device proximity to the merchant device may also be updated in response to the merchant input.

At 1216, the server may be configured to receive a selection of consumer identifying data associated with the consumer device. For example, the selection of consumer identifying data may be received based on the merchant selecting a consumer indication 1402-1410 of consumer display 1400. In another example, the selection may be received based on the merchant selecting consumer indication 1008 in presence display 1000. In that sense, consumer display 1400 and/or presence display 1000 may be used to facilitate a seamless redemption and/or payment. For example, based on the consumer following redemption instructions 1304 and stating the consumer's name to the merchant associated with the merchant device, the merchant can identify the applicable consumer identifying data within the merchant interface to begin a transaction with the consumer. In that sense, the merchant interface may include an indication of the message that the consumer is instructed to provide by redemption instruction 1304 to match the consumer with the consumer's data and/or transaction session. While the examples shown provide for a technique where a consumer can provide payment or perform promotion redemption based on saying consumer name, any suitable message may also be used. For example, the message may be a phrase, token, password, passcode, and/or key, among other things. In some embodiments, the server may be configured to generate the message and to provide the message to both the consumer device and the merchant device to assist in the seamless consumer identification for the merchant. In some embodiments, the server may be configured to provide for redemption by name (or other first type of consumer identifying data) in a default case, but in the event that multiple consumers share the same name, may provide for a non-name-based message.

At 1218, the server may be configured to provide the indication of the redeemable promotion to the merchant interface. The server may be configured to provide the indication of the redeemable promotion based on the merchant selecting a consumer indication in the merchant interface. In another example, the server may provide the indication without any action from the merchant or receiving any instruction from the merchant device. For example, the indication of the redeemable promotion may be provided in response to receiving consumer presence data from a communication beacon indicating that the consumer device at 1204, and requiring no additional consumer device or merchant device instruction or input. As such, the merchant may be able to perform an expedited (e.g., 1-action) redemption, such as by selecting redeem button 1412 within consumer indication 1402 of consumer display 1400.

At 1220, the server may be configured to receive an instruction to redeem the redeemable promotion. For example, the instruction may be provided from the merchant device based on the merchant selecting a redeem button within the merchant interface, such as redeem button 1412 and/or redeem button 1112. In another example, the instruction may additionally or alternatively be provided to the server from the consumer device, such as to receive a consumer confirmation. However, in some embodiments, the server may be request or otherwise require a consumer confirmation such that seamless redemption can be provided to the consumer (e.g., without requiring that the consumer provides any consumer inputs via the consumer device) for the transaction.

At 1222, the server may be configured to facilitate redemption of the redeemable promotion in response to receiving the instruction to redeem the redeemable promotion. For example, where the redeemable promotion is associated with a promotional value, the server may be configured to deduct the promotional value of the redeemable promotion from a total cost of a transaction. The server may be further configured to track the redeemable promotions and to record the redemption, such as by disassociating the redeemable promotion with a consumer account of the consumer. The discussion at 914 of method 900 may also be applicable at 1222. For example, the server may be configured to facilitate redemption in connection with point-of-sale functionality. Method 1200 may then proceed to 1224 and end.

CONCLUSION

Many modifications and other embodiments will come to mind to one skilled in the art to which these embodiments pertain having the benefit of the teachings presented in the foregoing descriptions and the associated drawings. For example, some or all of the steps in the method flows above being described as being performed by a server may be performed by a merchant device and/or communication beacon. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for providing a seamless transaction, the system comprising:
    one or more servers; and
    a communication beacon having a fixed location in communication with the one or more servers, the one or more servers configured to:
        receive consumer presence data indicating that a consumer device is within a direct communicable range of the communication beacon based at least in part on a consumer device wireless signal strength value associated with the consumer device;
        associate the communication beacon with a merchant based on beacon identifier data corresponding with the merchant;
        determine merchant information based at least in part on the beacon identifier data;
        provide at least a portion of the merchant information to the consumer device;
        authenticate the consumer device based at least in part on at least one biometric identifier in authentication data received from the consumer device;
        in response to authenticating the consumer device based at least in part on the at least one biometric identifier, cause the seamless transaction between the consumer device and the merchant based at least in part on the consumer presence data indicating that the consumer device is within the direct communicable range of the communication beacon;
        receiving, from the communication beacon, an indication that the consumer device is no longer within the direct communicable range of the communication beacon; and
        responsive to the indication that the consumer device is no longer within the direct communicable range of the communication beacon, generate and provide a consumer review interface for display by the consumer device.

2. The system of claim 1, wherein causing the seamless transaction includes identifying payment data associated with a consumer account.

3. The system of claim 2, wherein the payment data comprises one or more redeemable promotions.

4. The system of claim 1, wherein the one or more servers are further configured to:
    transmit, based at least in part on the consumer presence data, an impression of a promotion to the consumer device.

5. The system of claim 4, wherein the consumer presence data indicates that the consumer device is outside a shop associated with the merchant, and wherein the impression of the promotion comprises an outside-of-shop promotion.

6. The system of claim 4, wherein the merchant information further comprises one or more of item data associated with the merchant, a merchant webpage, a merchant location, and merchant business hours.

7. The system of claim 4, wherein the merchant information comprises item data and the one or more servers are further configured to:
    provide a merchant interface to a merchant device for entry of the item data.

8. A machine-implemented method for providing a seamless transaction comprising:
    receiving, by processing circuitry of one or more servers, consumer presence data from a communication beacon having a fixed location indicating that a consumer device is within a direct communicable range of the communication beacon based at least in part on a consumer device wireless signal strength value associated with the consumer device;
    associating, by the processing circuitry of the one or more servers, the communication beacon with a merchant based on beacon identifier data identifying the communication beacon with the merchant;
    determining, by the processing circuitry of the one or more servers, merchant information based at least in part on the beacon identifier data;
    providing, by the processing circuitry of the one or more servers, the merchant information to the consumer device;
    authenticating, by the processing circuitry of the one or more servers, the consumer device based at least in part on at least one biometric identifier in authentication data received from the consumer device;
    in response to authenticating the consumer device based at least in part on the at least one biometric identifier, causing, by the processing circuitry of the one or more servers, the seamless transaction between the consumer device and the merchant based at least in part on the consumer presence data indicating that the consumer device is within the direct communicable range of the communication beacon;
    receiving, by the processing circuitry of the one or more servers, from the communication beacon, an indication that the consumer device is no longer within the direct communicable range of the communication beacon; and
    responsive to the indication that the consumer device is no longer within the direct communicable range of the communication beacon, generating and providing, by the processing circuitry of the one or more servers, a consumer review interface for display by the consumer device.

9. The machine-implemented method of claim 8, wherein causing the seamless transaction includes identifying payment data associated with a consumer account.

10. The machine-implemented method of claim 9, wherein the payment data comprises one or more redeemable promotions.

11. The machine-implemented method of claim 8, further comprising:
    transmitting, by the processing circuitry of the one or more servers, based at least in part on the consumer presence data, an impression of a promotion to the consumer device.

12. The machine-implemented method of claim 11, wherein the consumer presence data indicates that the consumer device is outside a shop associated with the merchant, and wherein the impression of the promotion comprises an outside-of-shop promotion.

13. The machine-implemented method of claim 11, wherein the merchant information further comprises one or more of item data associated with the merchant, a merchant webpage, a merchant location and merchant business hours.

14. The machine-implemented method of claim 11, wherein the merchant information comprises item data and the machine-implemented method further comprises:
    providing, by the processing circuitry of the one or more servers, a merchant interface to a merchant device for entry of the item data.

15. A computer program product for providing a seamless transaction, the computer program product comprising computer-readable program instructions stored on a non-transitory computer readable medium, the computer-readable program instructions configured, upon execution by processing circuitry of one or more servers, to:
    receive consumer presence data indicating that a consumer device is within a direct communicable range of a communication beacon based at least in part on a consumer device wireless signal strength value associated with the consumer device;
    associate the communication beacon with a merchant based on beacon identifier data corresponding with the merchant;
    determine merchant information based at least in part on the beacon identifier data;
    provide at least a portion of the merchant information to the consumer device;
    authenticate the consumer device based at least in part on at least one biometric identifier in authentication data received from the consumer device;
    in response to authenticating the consumer device based at least in part on the at least one biometric identifier, cause the seamless transaction between the consumer device and the merchant based at least in part on the consumer presence data indicating that the consumer device is within the direct communicable range of the communication beacon;
    receive, from the communication beacon, an indication that the consumer device is no longer within the direct communicable range of the communication beacon; and
    responsive to the indication that the consumer device is no longer within the direct communicable range of the communication beacon, generate and provide a consumer review interface for display by the consumer device.

16. The computer program product of claim 15, wherein causing the seamless transaction includes identifying payment data associated with a consumer account.

17. The computer program product of claim 16, wherein the payment data comprises one or more redeemable promotions.

18. The computer program product of claim 15, wherein the computer-readable program instructions are further configured, upon execution by the processing circuitry of the one or more servers, to:
    transmit, based at least in part on the consumer presence data, an impression of a promotion to the consumer device.

19. The computer program product of claim 18, wherein the consumer presence data indicates that the consumer device is outside a shop associated with the merchant, and wherein the impression of the promotion comprises an outside-of-shop promotion.

20. The computer program product of claim 18, wherein the merchant information further comprises one or more of item data associated with the merchant, a merchant webpage, a merchant location, and merchant business hours.

\* \* \* \* \*